United States Patent
Wakabayashi et al.

(10) Patent No.: US 7,990,819 B2
(45) Date of Patent: Aug. 2, 2011

(54) OPTICAL HEAD APPARATUS AND OPTICAL INFORMATION APPARATUS

(75) Inventors: Kanji Wakabayashi, Kyoto (JP); Yoshiaki Komma, Osaka (JP); Toshiyasu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 995 days.

(21) Appl. No.: 10/590,968

(22) PCT Filed: Apr. 18, 2005

(86) PCT No.: PCT/JP2005/007398
§ 371 (c)(1),
(2), (4) Date: Aug. 29, 2006

(87) PCT Pub. No.: WO2005/104110
PCT Pub. Date: Nov. 3, 2005

(65) Prior Publication Data
US 2008/0163278 A1      Jul. 3, 2008

(30) Foreign Application Priority Data

Apr. 22, 2004 (JP) ................................. 2004-126593
Dec. 2, 2004 (JP) ................................. 2004-350310

(51) Int. Cl.
G11B 7/00 (2006.01)
(52) U.S. Cl. ............. 369/44.37; 369/44.14; 369/112.01; 369/112.08; 369/112.24
(58) Field of Classification Search ........................ None
See application file for complete search history.

(56) References Cited

U.S. PATENT DOCUMENTS

| 5,986,984 A | 11/1999 | Nakamura et al. |
| 2004/0114495 A1 | 6/2004 | Kim et al. |
| 2005/0190662 A1 | 9/2005 | Rosmalen |

FOREIGN PATENT DOCUMENTS

| JP | 1-302547 | 12/1989 |
| JP | 9-7201 | 1/1997 |
| JP | 9-17005 | 1/1997 |
| JP | 9-35304 | 2/1997 |
| JP | 9-198708 | 7/1997 |
| JP | 10-64114 | 3/1998 |
| JP | 10-106022 | 4/1998 |
| JP | 11-120587 | 4/1999 |
| JP | 2000-20987 | 1/2000 |
| JP | 2001-184681 | 7/2001 |
| JP | 2002-150584 | 5/2002 |
| JP | 2002-208173 | 7/2002 |
| JP | 2002-245650 | 8/2002 |
| JP | 2004-134056 | 4/2004 |
| KR | 10-2004-0021324 | 3/2004 |
| WO | 03/073152 | 9/2003 |
| WO | 03/088220 | 10/2003 |

*Primary Examiner* — Muhammad N. Edun
(74) *Attorney, Agent, or Firm* — Wenderoth, Lind & Ponack, L.L.P.

(57) ABSTRACT

An optical head apparatus is made to be downsized while obtaining an sufficient driving force of an objective lens actuator. The optical head apparatus includes a first optical system including a first objective lens for focusing a light beam upon an optical disc; a second optical system including a second objective lens for focusing a light beam upon an optical disc having an information recording density smaller than the optical disc which the first optical system irradiates upon, the second objective lens having a numerical aperture smaller than the first objective lens; and an up-orienting prism including a first reflecting surface for deflecting a light beam to an optical axis of the first objective lens in the first optical system, and a second reflecting surface for deflecting a light beam to an optical axis of the second objective lens in the second optical system.

35 Claims, 17 Drawing Sheets

OPTICAL HEAD APPARATUS AND OPTICAL INFORMATION APPARATUS

TECHNICAL FIELD

The present invention relates to an optical information apparatus which conducts reproducing of information from an information recording medium such as an optical disc, and recording of information in a recording medium, and an optical head apparatus which conducts reproducing and recording of information in the optical information apparatus.

BACKGROUND ART

A digital versatile disc (DVD) is known as an optical disc capable of recording a large volume of data, since it can record digital information about six times as much as a compact disc (CD). Recently, as an information amount to be recorded in an optical disc increases, an optical disc having a large capacity is required. In order to make an optical disc have a large capacity, it becomes necessary to increase the recording density of information by miniaturizing the optical spot to be defined by a ray of light irradiated onto the optical disc when the information is recorded on the optical disc and the information recorded on the optical disc is reproduced. For example, the optical spot can be miniaturized by shortening the wavelength of a laser beam from a light source, and increasing the numerical aperture (NA) of an objective lens. When conducting recording and reproducing of a DVD, a light source having a wavelength of 660 nm and an objective lens having a numerical aperture (NA) of 0.6 are used. Further, for example, by using a blue laser having a wavelength of 405 nm and an objective lens having a numerical aperture (NA) of 0.85, the recording density can be made to have five times as much as that of the current DVD.

An optical information apparatus capable of conducting high density recording and reproducing using a laser beam having a short wavelength by a blue laser is provided with a compatible function capable of conducting for an existing optical disc, which thus makes it possible to raise the usability of the optical information apparatus, and improve the cost performance. In this case, it is difficult to render the objective lens to have a high numerical aperture of 0.85 and a long operational distance (a space between the objective lens and an optical disc) as an objective lens for DVD or CD. For this reason, in a compatible-type optical information apparatus capable of conducting recording and reproducing at a high density, it is preferable to provide at least one objective lens used for conducting recording and reproducing onto and from CD or DVD, and another objective lens having a numerical aperture larger than the one objective lens and adapted for conducting high density recording.

Meanwhile, an objective lens actuator for an optical information apparatus is provided with a magnetic circuit for driving an objective lens both in a focusing direction and in a tracking direction. The magnetic circuit holds the space between the optical disc and the objective lens constant in the focusing direction, and moves the objective lens to a desired track position in the tracking direction. However, as mentioned above, in the optical information apparatus of performing compatibly for a plurality of optical discs having different recording densities, there is the necessity of providing objective lenses respectively corresponding to the plural optical discs having different recording densities. For this reason, the objective lens actuator is required to have a configuration where a plurality of objective lenses are mounted in a movable member, and are moved in the focusing direction and the tracking direction.

For example, Patent Document 1 discloses an optical head apparatus which is provided with a plurality of optical lenses on a movable member to thereby realize a compatible-type optical information apparatus which is capable of conducting recording and reproducing onto and from a plurality of optical discs having different recording densities (first prior art).

FIG. 17 shows a configuration of the optical head apparatus according to the first prior art. In this optical head apparatus, a light beam 61 emitted from a first light source (not shown) is regulated by a collimator lens 62 to have a parallelism, and deflected at a flat-shaped up-orienting mirror 63 so that an optical axis becomes perpendicular to an optical disc 65 having a high recording density. An objective lens 64 focuses the light beam 61 on a recording surface of the optical disc 65. A light beam 66 emitted from a second light source (not shown) is regulated by a collimator lens 67 to have a parallelism, and deflected at a flat-shaped up-orienting mirror 68 so that an axis becomes perpendicular to an optical disc 70 having a low recording density. An objective lens 69 focuses the light beam 66 on the recording surface of the optical disc 70.

An objective lens driving apparatus (objective lens actuator) 71 can move the first objective lens 64 both in the focusing direction F perpendicular to the recording surface of the optical disc 65 having a high recording density and in the tracking direction T of the optical disc 65. Further, an objective lens driving apparatus (objective lens actuator) 72 can move the second objective lens 69 both in the focusing direction F perpendicular to the recording surface of the optical disc 70 having a low recording density and the tracking direction T of the optical disc 70.

The objective lenses 64 and 69 are respectively fixedly attached at predetermined positions of the objective actuators 71 and 72.

Further, Patent Documents 2 and 3 disclose that two objective lenses are mounted on a single objective lens actuator, for example (second and third prior arts).

Patent Document 1: Japanese Unexamined Patent Publication No. 2002-208173,

Patent Document 2: Japanese Unexamined Patent Publication No. Hei. 11-120587, and Patent Document 3: Japanese Unexamined Patent Publication No. 2002-245650.

DISCLOSURE OF THE INVENTION

However, the first prior art has the problem that because the two objective lenses are provided, the space between the objective lenses 64 and 69 cannot be reduced, which consequently hinders the miniaturization of the optical head apparatus. If the both objective lens actuators 71 and 72 are made smaller to solve this problem, a space to mount a coil or a magnet for producing a driving force in the movable member becomes insufficient. This causes a problem that the driving force cannot be obtained sufficiently.

In the second prior art, an optical axis passing one objective lens extends from a light source to the one objective lens in a straight line. For this reason, there has been the problem that the size of the optical head apparatus becomes considerably larger in a direction perpendicular to an optical disc placed in the optical head apparatus.

Further, in the second prior art, the two objective lenses are mounted on the single objective lens actuator. Even if this technique is combined with the first prior art, there still remains a problem. Specifically, similarly to the apparatus shown in FIG. 17, in the second prior art, an up-orienting mirror 63 and an up-orienting mirror 68 are separately provided from each other. Therefore, it is required to provide a space for end portions 63a and 68a, and to arrange the objective lens 64 and the objective lens 69 spaced away from each other. Further, in order to prevent the up-orienting mirror 63 or 68 from generating aberration due to a deformation thereof, it is necessary to have a thickness of at least 1 mm. Accordingly, it is necessary to provide a space of √2 mm between the end portions 63a and 68a. For this reason, it is necessary to arrange the objective lens 64 and the objective lens 69 spaced away from each other by 1.4 mm or more. In the case of mounting them on a single objective lens actuator, a lens holder for supporting the two objective lenses have an increased volume, and an increased weight. As a result, this causes the problem that the sufficient driving force cannot be obtained.

To solve the above-mentioned conventional problems, the present invention includes a first optical system including a first objective lens for focusing a light beam upon an optical disc; a second optical system including a second objective lens for focusing a light beam upon an optical disc having an information recording density smaller than the optical disc which the first optical system irradiates upon, the second objective lens having a numerical aperture smaller than the first objective lens; and a deflecting element including a first reflecting surface for deflecting a light beam to an optical axis of the first objective lens in the first optical system, and a second reflecting surface for deflecting a light beam to an optical axis of the second objective lens in the second optical system.

According to the present invention, a plurality of objective lenses for conducting recording and reproducing onto and from the plural optical discs having different recording densities can be mounted closely to each other. Further, these plural objective lenses can be mounted on a single objective lens actuator.

Accordingly, in the optical head apparatus provided with a plurality of objective lenses to realize the compatible-type optical information apparatus which is capable of conducting recording and reproducing onto and from a plurality of optical discs having different recording densities, a stable focusing control capability can be realized for optical discs having different recording densities.

BEST MODE OF CARRYING OUT THE INVENTION

Figure 1:
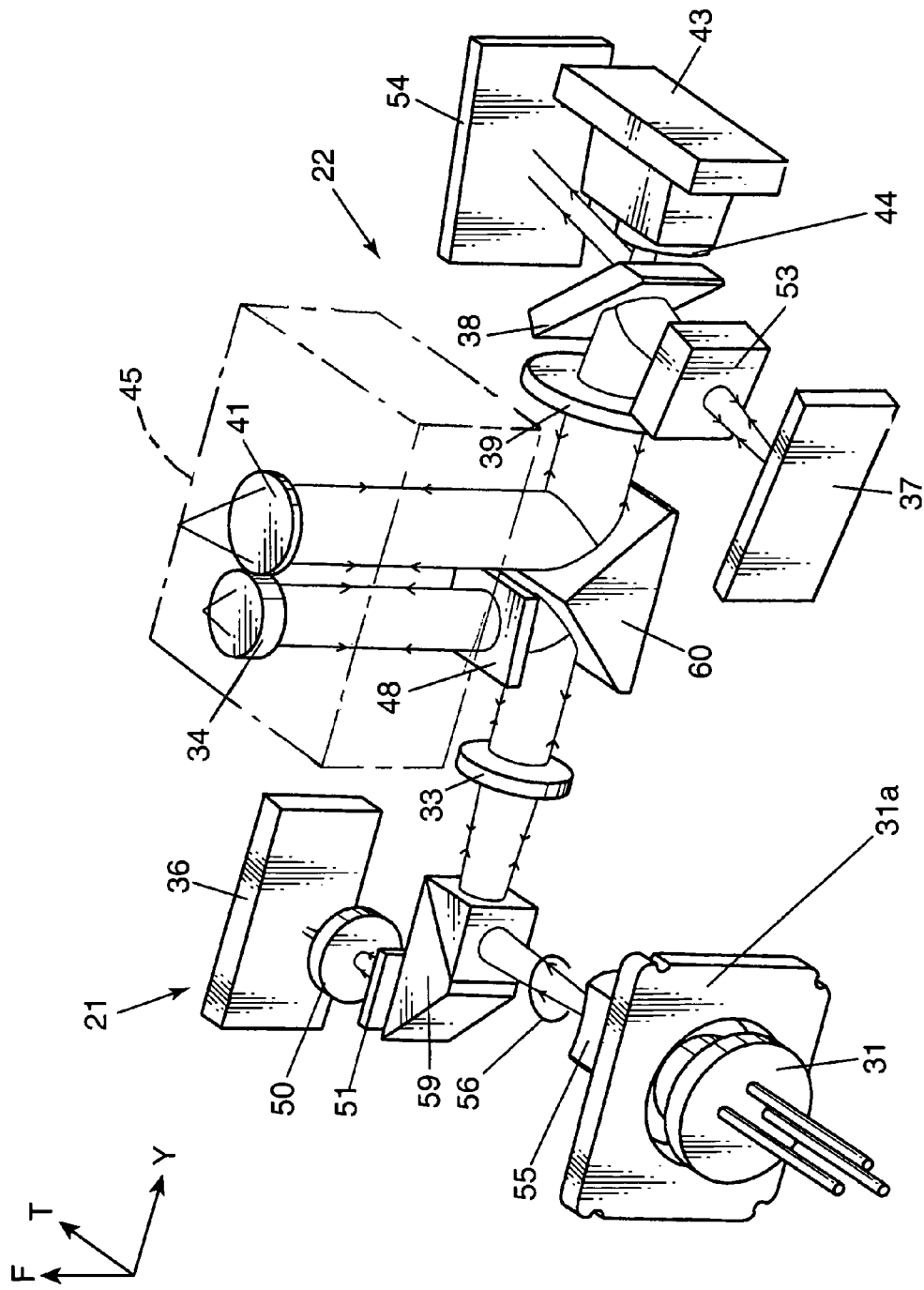
FIG. 1 is a perspective view schematically showing a main part of an optical head apparatus according to a first embodiment of the present invention.

Hereinafter, embodiments of the present invention are described referring to the drawings.

First Embodiment

Figure 2:
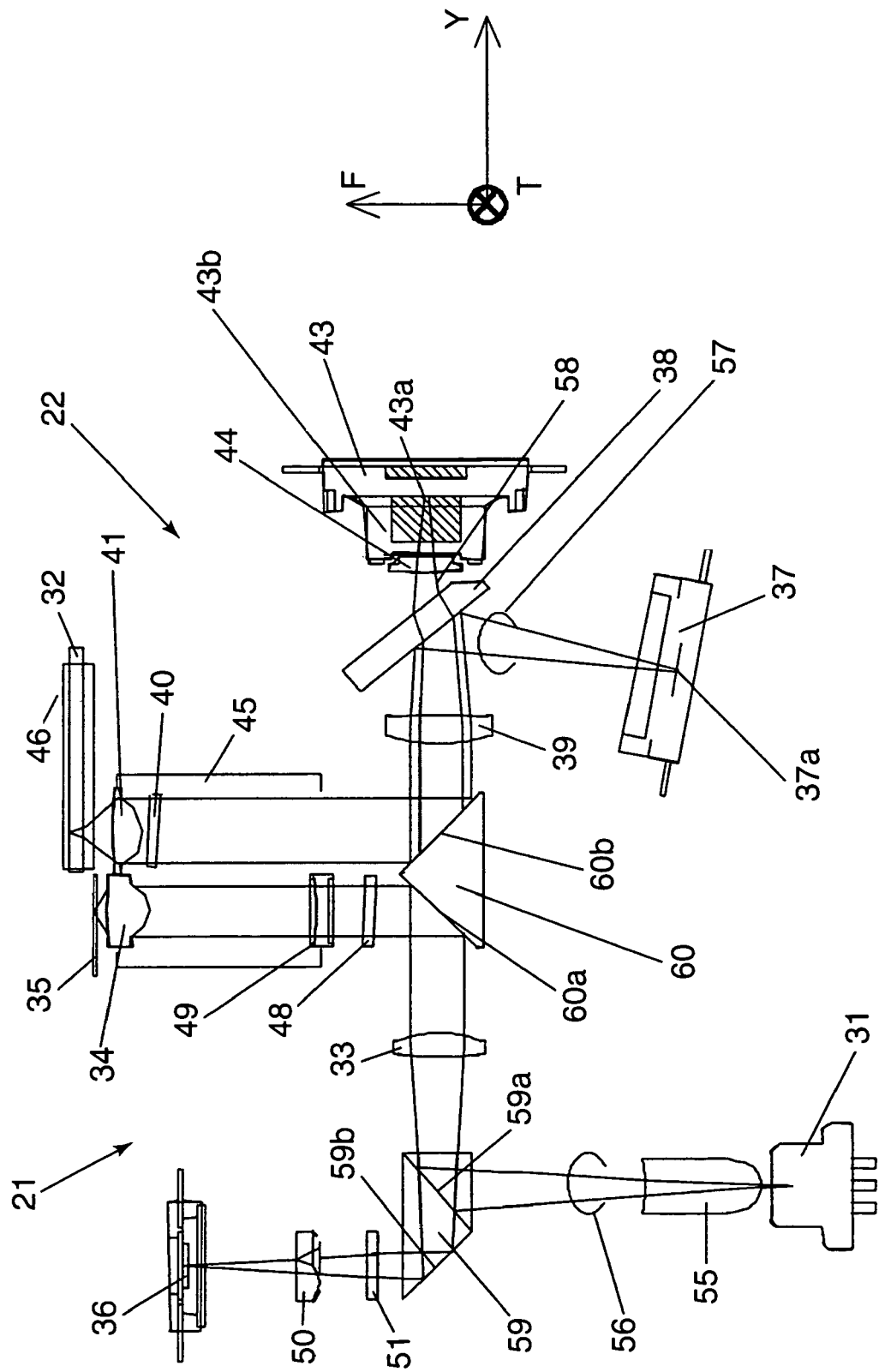
FIG. 2 is a schematic side view of the optical head apparatus.
Figure 3:
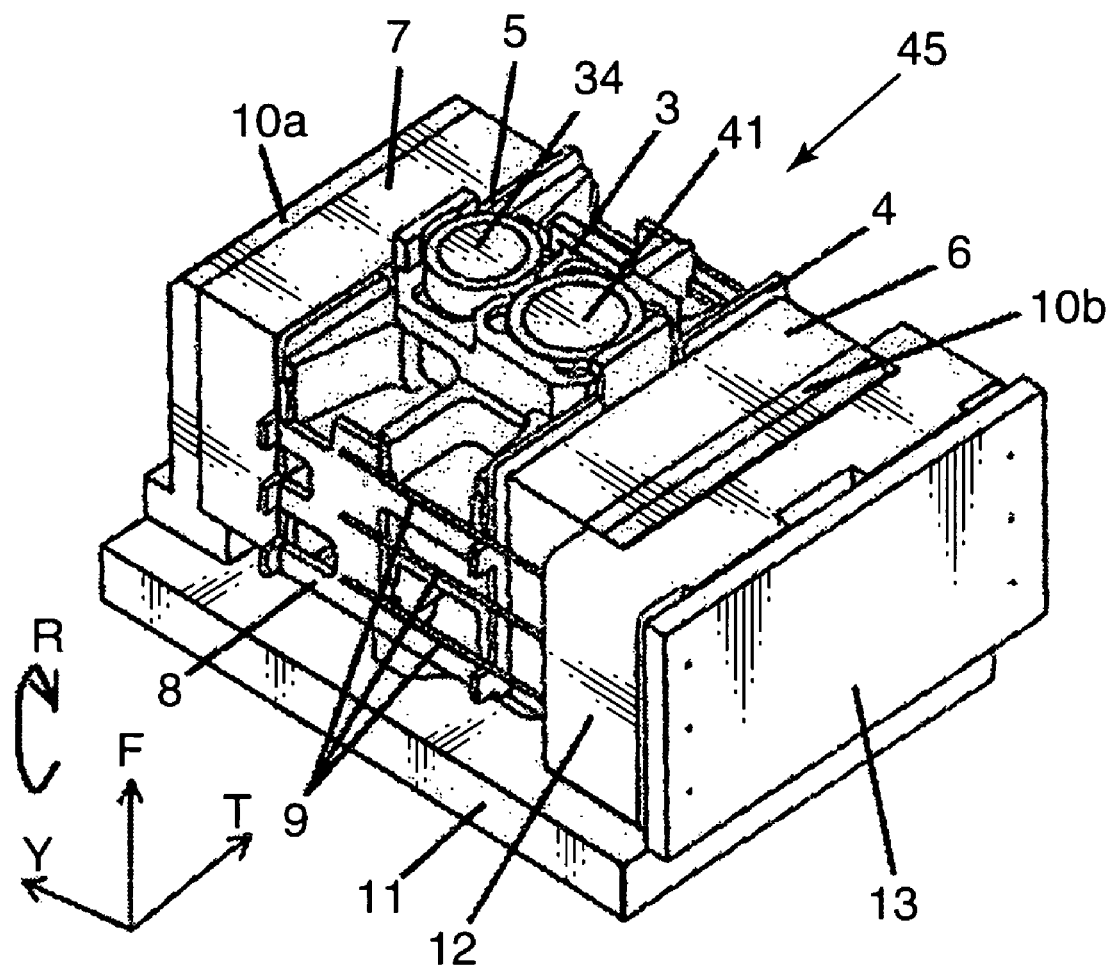
FIG. 3 is a perspective view showing a configuration of an objective lens actuator mounted on the optical head apparatus.
Figure 4:
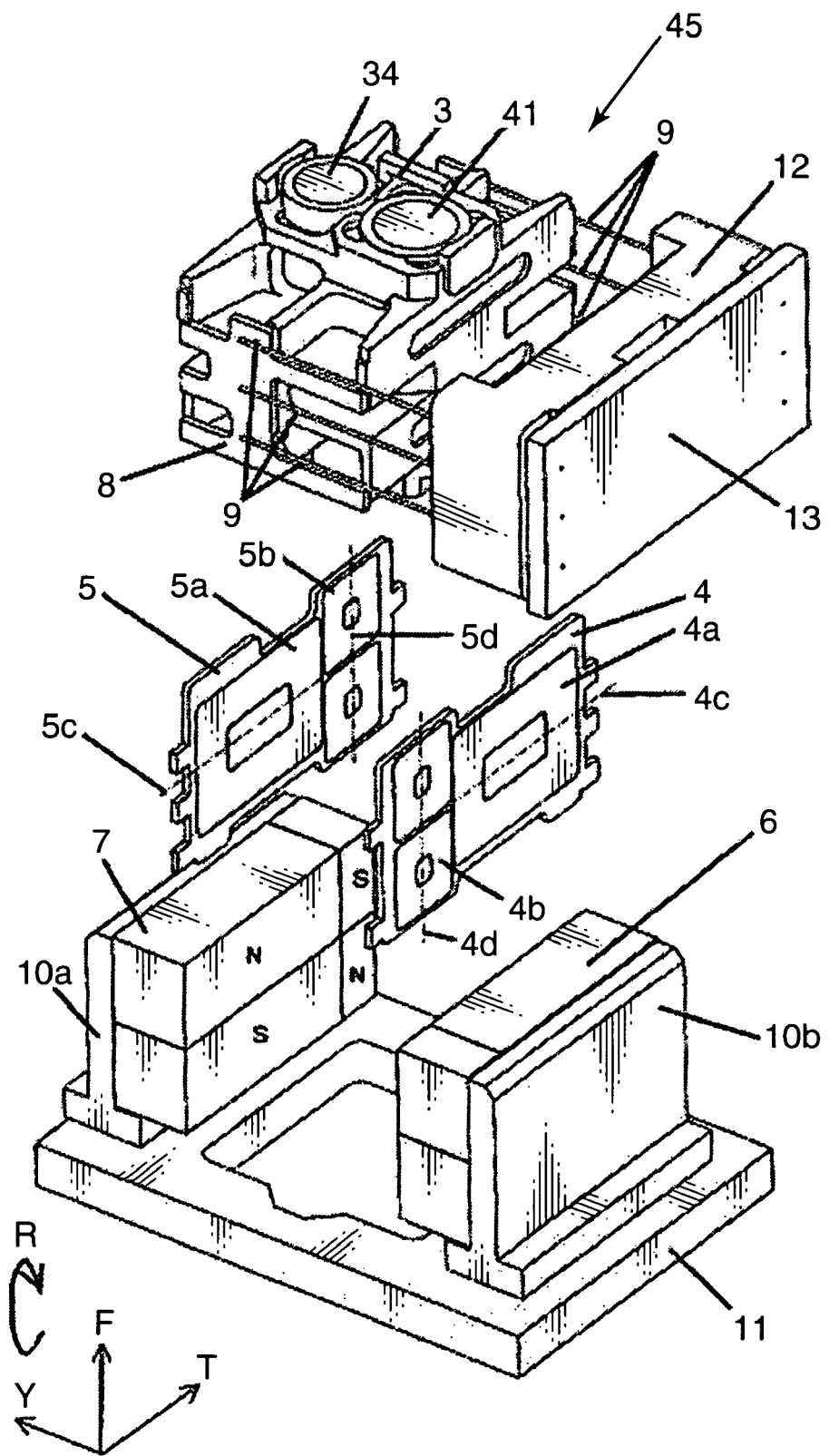
FIG. 4 is an exploded perspective view showing a configuration of the objective lens actuator.

FIG. 1 is a perspective view showing a main part of an optical head apparatus according to a first embodiment of the present invention. FIG. 2 is a diagrammatic general side view showing the optical head apparatus according to the first embodiment of the present invention. FIG. 3 is a perspective view showing a configuration of an objective lens actuator according to the first embodiment of the present invention. FIG. 4 is an exploded perspective view showing the configuration of the objective lens actuator according to the first embodiment of the present invention.

In FIGS. 1 to 3, T, F, and Y respectively indicate a tracking direction (T-direction), a focusing direction (F-direction), and a tangential direction (Y-direction) to an optical disc. The tracking direction is substantially perpendicular to optical axes of objective lenses 34 and 41 and substantially perpendicular to a tangential direction to a track groove of optical discs 32, 35, and 46, namely, in a direction perpendicular to the drawing sheet bearing the FIG. 2. The focusing direction is substantially parallel to the optical axes of the objective lenses 34 and 41. The tangential direction is substantially parallel to a tangential line of the track groove of the optical discs 32, 35, and 36 (See FIG. 2.).

The optical head apparatus includes a first optical system 21 and a second optical system 22. The first optical system 21 is provided with the objective lens 34 for a high density (a first objective lens), whereas the second optical system 22 is provided with the objective lens 41 for a low density (a second objective lens) which has a numerical aperture (NA) smaller than the objective lens for high density.

The first optical system 21 is an optical system for irradiating an optical disc 35 having a high information recording density. The first optical system 21 at least includes a first light source 31, a collimator lens 33, and the first objective lens 34. On the other hand, the second optical system 22 is an optical system for irradiating optical discs 32 and 46 having an information recording density lower than the optical disc 35 to be irradiated by the first optical system 21. The second optical system 22 at least includes a second light source 37a, a third light source 43a, a collimator lens 39, and the second objective lens 41. The third light source 43a is used to irradiate the optical disc 46 (for example, a compact disc: CD) having an information recording density lower than the optical disc 32 (for example, digital versatile disc: DVD) to which a light beam 58 emitted from the second light source 37a is directed. In other words, the wavelength of the emitted light is shorter in the order of the third light source 43a, the second light source 37a, and the first light source 31. In this specification, the term "DVD" includes a DVD-R, a DVD-ROM, a DVD-RAM, a DVD-RW, and the like. The term "CD" includes a CD-R, a CD-ROM, a CD-RW and the like.

The first optical system 21 and the second optical system 22 commonly use an up-orienting prism 60 as a deflecting element. The up-orienting prism 60 is a triangle prism having a substantially triangle shape in a cross section, and includes an oblique face 60a (a first reflecting face) and an oblique face 60b (a second reflecting face). The up-orienting prism 60 is a substantially isosceles triangle in a cross section, having an angle of 90° formed by the oblique face 60a and the oblique face 60b. The oblique face 60a reflects a light beam 56 emitted from the first light source 31. The oblique face 60b reflects light beams 57 and 58 emitted respectively from the second light source 37a and the third light source 43a.

The degree of parallelism of the light beam 56, which has a short wavelength and is emitted from the first light source 31 (for example, a blue light source), is regulated by the collimator lens 33, and deflected at the oblique face 60a of the up-orienting prism 60 so that the optical axis becomes perpendicular to the optical disc 35 having the high recording density. The first objective lens 34 focuses the light beam 56 reflected by the oblique face 60a on a recording surface of the optical disc 35. The light beam reflected upon the recording surface of the optical disc 35 travels back on the original light path, and is diverged to a different direction from the original direction by diverging means (or a diverging element), such as a polarized light beam splitter 59, and detected by an optical detector 36. The light beam is photoelectrically converted by the optical detector 36 to thereby generate an electric signal for obtaining an information signal and a servo signal (a focusing error signal for focusing control, a tracking signal for tracking control).

In the up-orienting prism 60, it may be appreciated to plane off the respective ridges of the prism that are vertexes of the triangular section. With this configuration, broken-off can be prevented. In this specification, such configuration as having planed-off ridges is referred to be substantially a triangular shape in the cross section.

The degree of parallelism of the light beam 57, which is emitted from the second light source 37a (for example, a red light source), is regulated so as to be substantially parallel by the collimator lens 39, and is deflected on the oblique face 60b of the up-orienting prism so that the optical axis of the light beam 57 becomes perpendicular to the optical disc 32 having the low record density. At this time, the light beam 57 is substantially parallel to the light beam 56 deflected on the oblique face 60a. The second objective lens 41 focuses the light beam 57 on the recording surface of the optical disc 32. The light beam reflected upon the recording surface of the optical disc 32 travels back on the original light path, and diverged to a different direction from the original direction by diverging means (or a diverging element), such as a polarized hologram 40. The light beam is photoelectrically converted by an un-illustrated optical detector to thereby generate an electric signal for generating an information signal, a servo signal (a focusing error signal for focusing control, a tracking signal for tracking control). The optical detector can be mounted inside a combined unit 37 including the light source. With this arrangement, the optical head apparatus can be made smaller and thinner, thereby ensuring stabilization.

In a case of conducting reproducing or recording to the optical disc 46 having the recording density lower than the above mentioned optical discs 35 and 32, the third light source 43a (for example, a red light source) is used. The degree of parallelism of the light beam 58 emitted from the third light source 43a is regulated so as to be substantially parallel by the collimator lens 39, and is deflected on the oblique face 60b so that the optical axis of the light beam 58 becomes perpendicular to the optical disc 46. The second objective lens 41 focuses the light beam 58 onto the recording surface of the optical disc 46. The light beam reflected upon the recording surface of the optical disc 46 travels back on the original light path, and diverged to a different direction from the original direction by diverging means (or a diverging element), such as a hologram 43b. The light beam is photoelectrically converted by an un-illustrated optical detector to thereby generate an electric signal for obtaining an information signal, a servo signal (a focusing error signal for focusing control, a tracking signal for tracking control). The optical detector can be mounted inside a combined unit 43 including the light source. With this arrangement, the optical head apparatus can be made smaller and thinner, thereby ensuring the stabilization.

The respective diverging means are mentioned to use different optical devices as an example. However, all the diverging means may use the other optical devices.

The both objective lenses 34 and 41 are respectively fixedly attached on predetermined positions of an objective lens actuator 45 (an objective lens driving device). Detailed configuration of the objective lens actuator 45 will be described later.

It is preferable to arrange the objective lenses 34 and 41 along the Y-direction. To the contrary, in the case where the objective lenses 34 and 41 are arranged along a direction perpendicular to the Y-direction, i.e., a radial direction of the optical disc, when one of the objective lenses 41 and 34 reaches an innermost or outermost portion of the optical disc, the other unused one is liable to hit an optical disc driving motor located on an inner side than the head apparatus or strike devices on an outer side than the head apparatus. For this reason, the objective lenses 34 and 41 are arranged along the Y-direction to move the objective lenses 34 and 41 in the T-direction as far as possible with keeping the optical head apparatus from hitting the optical disc driving motor or other units.

In the present embodiment, the up-orienting prism 60 is commonly used for deflecting the light beams in the first optical system 21 and the second optical system 22. In other words, the up-orienting prism 60 is a single element, and adapted for deflecting the optical axis of the light beam 56 emitted from the first light source 31 and the optical axes of the light beams 57 and 58 emitted from the second light source 37*a* and the third light source 43*a* on the oblique faces 60*a* and 60*b* defining short sides of a triangular sector of the prism so as to be respectively parallel to the optical axes of the objective lenses 34 and 41. With this arrangement, the space between the optical axes of objective lenses is not necessary to be wide as the first prior art, and the gap between the objective lenses 34 and 41 (i.e., a gap between the oppositely facing outer ends of the objective lenses) can be set not more than 1 mm. Thus, the optical head apparatus can be more minimized in comparison with the conventional apparatuses. Further, the optical head apparatus can be made thinner, and a movable body of the objective lens actuator can be made lighter, thereby obtaining the driving power sufficiently.

It is preferable that the light beam 56 coming to the up-orienting prism 60 and the light beams 57 and 58 coming to the up-orienting prism 60 are parallel to each other. It is also preferable that the reflecting faces 60*a* and 60*b* extend orthogonally to the substantially triangular cross section parallel to the drawing surface of FIG. 2. With this arrangement, the light beams 56, 57, and 58 reflected on the reflecting faces 60*a* and 60*b* and coming to the objective lenses 34 and 41 can be made parallel to the optical axes of the objective lenses 34 and 41. As described above, in the case where the both of the reflecting faces 60*a* and 60*b* extend orthogonally to the substantially triangular cross section, the up-orienting prism 60 can be produced by cutting a bar having the substantially triangular cross section and extending in one direction. Thus, it is possible to produce the up-orienting prism 60 effectively and at a low cost.

It is preferable to arrange the second objective lens 41 in such a manner that the optical axis thereof can move along a line substantially passing a center of the optical disc 32 or 46 and extending in a radial direction of the optical disc. In other words, it is preferable that the second objective lens move along the above mentioned line, when the optical head apparatus conducts a seek operation. In the second optical system 22, a diffraction grating is formed in a part of the hologram 43*b*, for example, to produce sub-beams from the light beam 58 which enable detection of a tracking signal by the three beam method. Accordingly, the arrangement in which the second objective lens 41 is so disposed as to move along the radial line can ensure stable signal detection. In this case, the first objective lens 34 is out of a line substantially passing the center of the optical disc 35 and extending in a radial direction of the optical disc 35. Accordingly, it is preferable to detect a tracking error signal by the one beam method in which a sub-beam is not used.

In the first prior art which uses two up-orienting mirrors, the incidence angle of a light beam to an objective lens can be adjusted by inclining the respective up-orienting mirrors. This can reduce the aberration out of the axis which is caused by a light beam obliquely falling on the objective lens. According to the present invention, however, since the deflecting mirror 60 is singly provided for both of the first optical system 21 and the second optical system 22, it is impossible to adjust the angle separately for the respective optical systems. Therefore, it is preferable to provide a holder 31*a* for slidably supporting the light sources 31, 37*a*, and 43*a* in directions perpendicular to their respective optical axes against an optical base (not shown). It will be seen that if the respective positions of the light sources 31, 37, and 43*a* can be adjusted, the respective optical axes can be separately adjusted in the state that the deflecting mirror 60 is held at the fixed position. Further, the arrangement in which the light sources 31, 37*a*, and 43*a* are movable in the directions perpendicular to their respective optical axes enables the angle of a light beam having passed through the collimator lenses 33 and 39 to be adjusted. Here, the optical base serves as a support frame to which the illustrated optical units are fixedly attached.

As shown in FIGS. 1 and 2, in the case where the first light source 31 includes a semiconductor laser, it is preferable to provide a lens 55 having a convex cylindrical surface on a light source end and a concave cylindrical surface on the opposite end thereof. The lens 55 is provided in the vicinity of the first light source 31 to thereby make a far-field pattern of the light beam 56 emitted from the first light source 31 come to the shape of a circle from the original shape of an ellipse, and increase the light use efficiency.

As shown in FIG. 2, a diffraction grating lens 49 having a convex lens function can be provided in a light path. The diffraction grating lens 49 is disposed between the up-orienting prism 60 and the first objective lens to thereby restrain the focal distance of the objective lens 34 from varying due to a refractive index variation following a wavelength change.

Further, a ¼ wavelength plate 48 is provided between the up-orienting prism 60 and the first objective lens, thereby improving the light use efficiency in the polarized light beam splitter 59.

A diffractive element 51 or a lens 50 having an irrotational symmetry configuration is disposed between the optical detector 36 and the polarized light beam splitter 59 to thereby generate a servo signal.

In a case where the numerical aperture (NA) of the first objective lens 34 is as large as 0.8 or more, it is preferable to provide a driver (not shown) for moving the collimate lens 33 along the optical axis because the spherical aberration shifts greatly due to an error in the thickness of a substrate of the optical disc 35. With this arrangement, a spherical aberration caused by a thickness error of the substrate can be corrected, and a stable operation can be thus executed in the recording and the reproduction of information.

In a case where the second light source 37*a* and the third light source 43*a* are provided separately, the light use efficiency of light beams emitted from the both light sources can be enhanced by using a dichroic mirror 38. It may be appreciated to integrate the light sources 37*a* and 43*a* into a single semiconductor chip. This can eliminate the dichroic mirror 38, and reduce the number of parts. Further, it may be appreciated to adopt a configuration which eliminate the second light source 37*a* or the third light source 43*a*.

As shown in the FIG. 2, it is preferable that the second objective lens 41 is thinner than the first objective lens 34. The first objective lens 34 has a numerical aperture larger than the second objective lens 41, which consequently makes the operational distance of the first objective lens 34 shorter than the second objective lens 34. For this reason, the second objective lens 41 is required to be arranged at a position further spaced away from the optical disc than the first objective lens 34. However, the thinner second objective lens 41 enables the both objective lenses 34 and 41 to be set in such a manner that their respective gravity centers are at the same level. As a result, the weight balance for the objective lens actuator 45 can be improved, and the accuracy in the moving control of the objective lens by the actuator 45 can be thus improved.

The diameter of the first objective lens 34 may be smaller than the diameter of the second objective lens 41. Specifically, the first objective lens 34 is thicker than the second objective lens 41. Accordingly, the diameter of the first objective lens 34 is made to be smaller than that of the second objective lens 41 to thereby make the respective weights of the both objective lenses 34 and 41 close to each other. Therefore, the weight balance for the objective lens actuator 45 can be improved. Further, the focal distance of the first objective lens 34 is made to be shorter than that of the second objective lens 41 to thereby cause the respective effective diameters of the both objective lenses the same as each other, and improve the weight balance more.

In the first embodiment where the oblique faces 60a and 60b of the up-orienting prism 60 are so arranged to deflect the light beam traveling from the first light source 31 to the oblique face 60a and the light beam traveling from the second light source 37a or the third light source 43a to the oblique face 60b, which travel in the opposite directions and substantially parallel to each other, in such a way to propagate from the respective oblique faces 60a and 60b substantially in parallel to each other, the inside space of the optical head apparatus can be utilized more efficiently. Further, the up-orienting prism 60 can be formed by cutting the bar-shaped material. Therefore, the production cost can be reduced.

Further, in the first embodiment, there are provided the polarized light beam splitter 59 (the first diverging element) for deflecting the light beam traveling from the first light source 31 to the up-orienting prism 60 (polarizing element) to the direction substantially parallel to the optical disc, and the dichroic mirror 38 (the second diverging element) for deflecting the light beam traveling from the second light source 37a to the up-orienting prism 60 to the direction substantially parallel to the optical disc. Therefore, the width of the optical head apparatus (width of the Y-direction in FIG. 2) can be prevented from increasing due to deflection of a light beam. Further, the polarized light beam splitter 59 and the dichroic mirror 38 are so configured as to deflect the light beams toward a side of the optical head apparatus. Therefore, the light path can be defined by effectively utilizing a space beneath the objective lens actuator 45.

Still further, in the first embodiment, the first optical system 21 is provided with the optical detector 36 in the opposite to the first light source 31 with respect to the polarized light beam splitter 59. The polarized light beam splitter 59 includes the first reflecting surface 59a for reflecting the light beam from the first light source 31 toward the up-orienting prism 60 and the second reflecting surface 59b for reflecting the light beam from the up-orienting prism 60 toward the optical detector 36. In other words, the polarized light beam splitter 59 deflects the respective light beams in the directions which are opposite and substantially perpendicular to each other. Therefore, the first light source 31 and the optical detector 36 can be disposed in the opposite to each other in the state that the polarized light beam splitter 59 is therebetween, and consequently prevent the optical head apparatus from becoming larger in size. Even if the polarized beam splitter 59 is subject to a temperature variation or the like, an image detected by the optical detector 36 can be stabilized since the first reflecting surface 59a and the second reflecting surface 59b move in the same direction. Therefore, the optical detection accuracy can be improved.

Now, the objective lens actuator 45 is described. The objective lens actuator 45 of the first embodiment is set in such a manner that the moving phase of one of the objective lenses 34 and 41 is delayed than that of the other objective lens under the focusing control of the objective lenses 34 and 41. Besides, the objective lens actuator 45 includes phase advancing means for advancing the phase in a predetermined frequency region when the focusing control is operated to the other objective lens. Reasons why the actuator 45 is constructed in the above manner will be described as follows.

Figure 11:
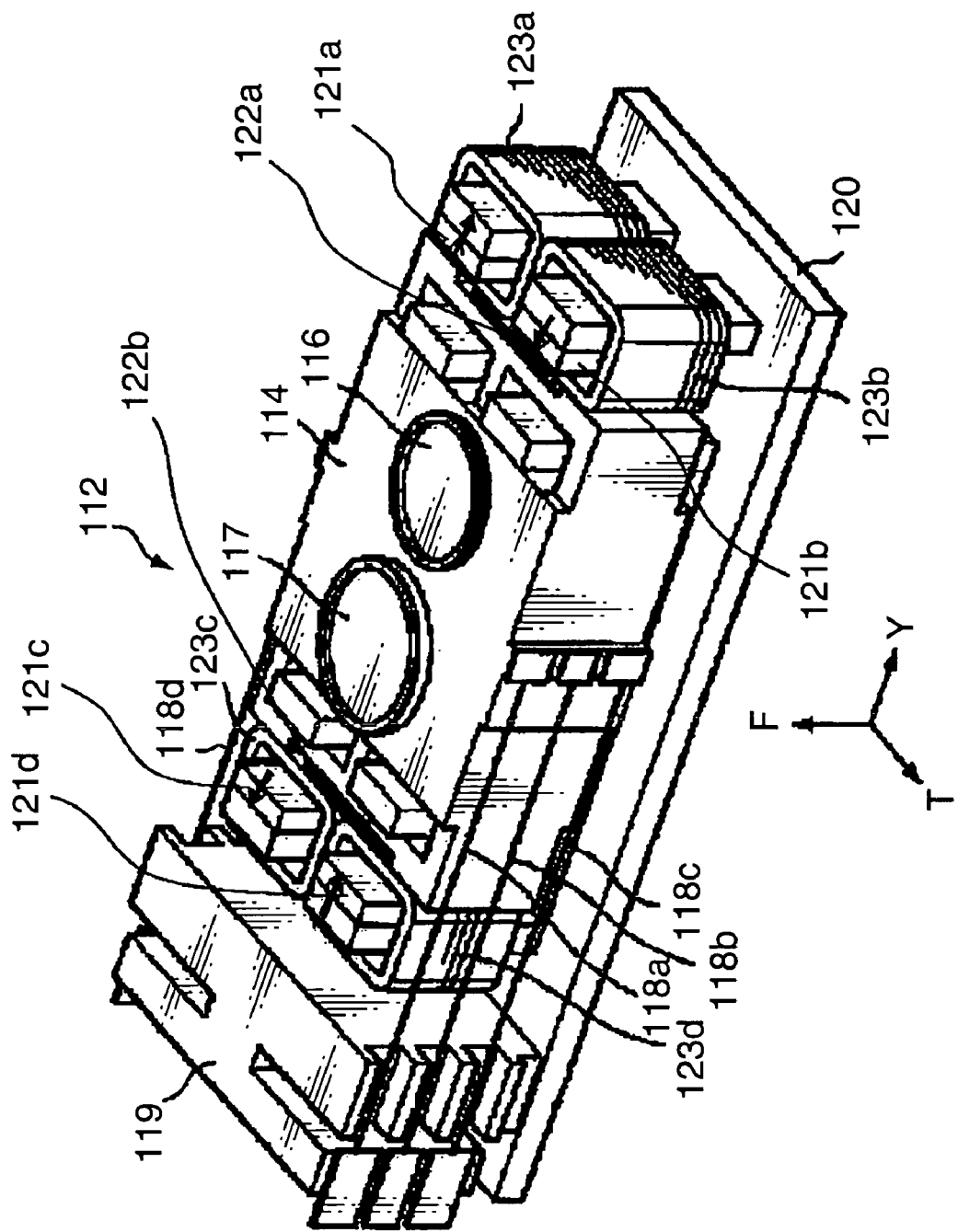
FIG. 11 is a perspective view showing a configuration of a conventional objective lens actuator.

First, the configuration disclosed in the patent document 3 raised as the third prior art is described, referring to FIG. 11.

An objective lens actuator 112 shown in FIG. 11 drives a second objective lens 116 and a first objective lens 117 both in the focusing direction (F-direction) perpendicular to the recording surface of an optical disc (not shown) and in the tracking direction (T-direction) of the optical disc. The F-direction is in the optical axis direction of the objective lenses 116 and 117. The respective objective lenses 116 and 117 are fixedly attached to a predetermined position of a lens holder 114. Further, in examples mentioned below, the second objective lens 116 is used for CD, the first objective lens 117 is used for DVD.

The lens holder 114 is supported by six wires 118a through 118f which are parallel to one another, and movable in three directions of the T-direction, the F-direction, and a rotational direction about the axis Y extending in the direction which the wires 118a through 118f extend in. Therefore, the two objective lenses 116 and 117 can move freely in the rotational direction about the axis Y in addition to the focusing direction and the tracking direction. The T-direction is perpendicular to the optical axis direction (the F-direction) of the objective lenses 116 and 117 and the direction (the Y-direction) in which each wire extends.

The six wires 118a to 118f are fixedly attached to a wire base 119. The wire base 119 is fixedly attached to an actuator base 120.

The actuator base 120 is made of a ferromagnetic material, such as ferrite or steel. The actuator base 120 is attached with first to forth permanent magnets 121a, 121b, 121c, and 121d in predetermined directions.

Figure 9:
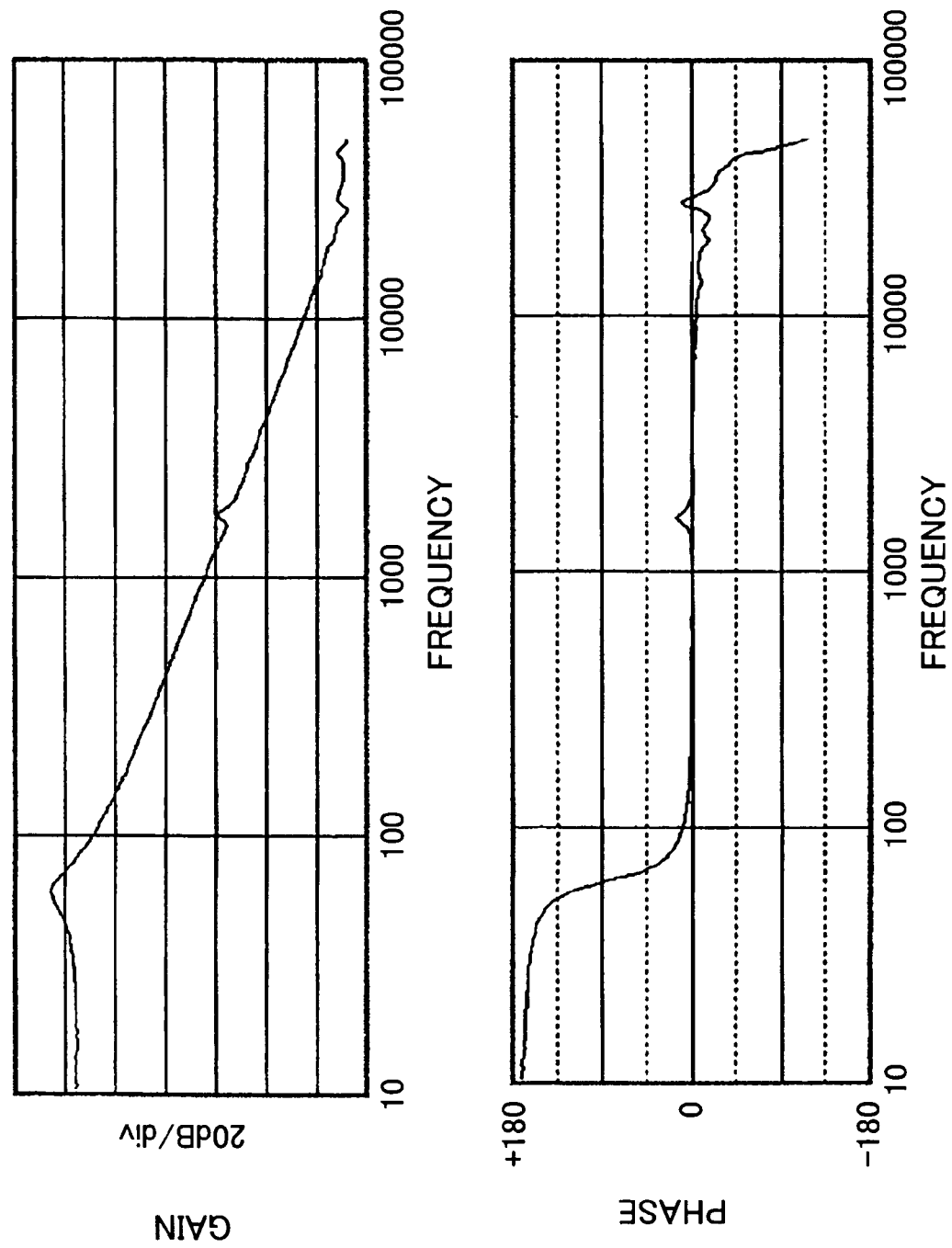
FIG. 9 is a characteristic diagram showing a moving frequency response characteristic of the first objective lens when conducting recording and reproducing onto and from the optical disc having the high recording density.
Figure 10:
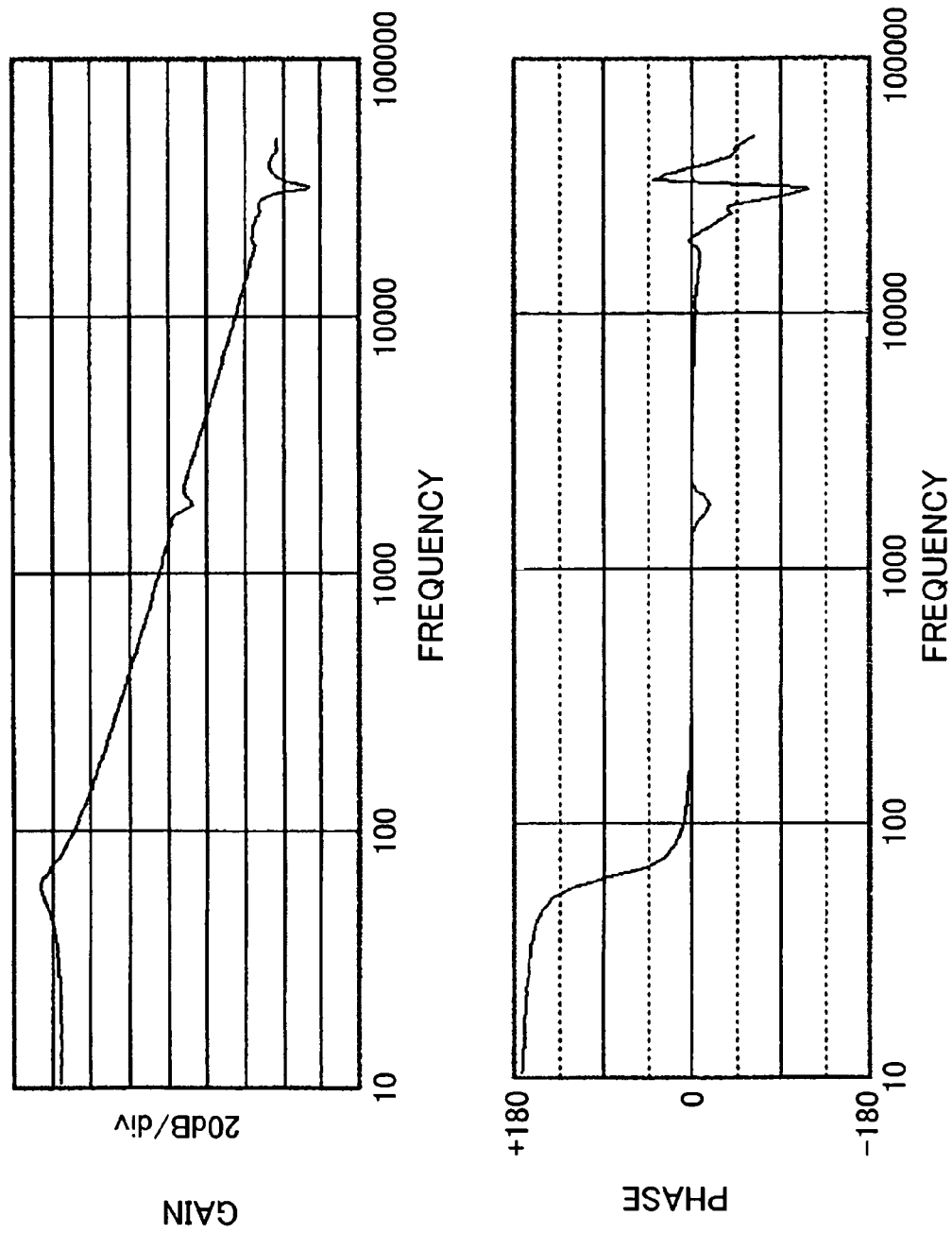
FIG. 10 is a characteristic diagram showing a moving frequency response characteristic of the second objective lens when conducting recording and reproducing onto and from the optical disc having the high recording density.

The permanent magnets 121a, 121b, 121c, and 121d are magnetized in the directions indicated by the arrows in FIG. 9 (sic). Accordingly, the permanent magnets 121a and 121b are magnetized in the opposite directions against each other, and the permanent magnets 121c and 121d are magnetized in the opposite directions against each other.

The lens holder 114 is fixedly attached with trucking driving coils 122a, 122b, and focusing driving coils 123a, 123b, 123c, and 123d.

Further, with respect to the objective lenses 116 and 117 held by the lens holder 114, the wavelength of the laser beam which passes through the second objective lens 116 which is used for CD is longer than the wavelength of the laser beam which passes through the first objective lens 117 which is used for DVD. The numerical aperture (NA) of the second objective lens 116 is smaller than that of the first objective lens 117.

In other words, the second objective lens 116 and the first objective lens 117 are provided on the lens holder 114 along the Y-direction in which the wires 118a through 118f extend. The second objective lens 116 having a smaller NA is provided in a distal end of the wires 118a to 118f with respect to a connection portion at which the wires 118a to 118f and the lens holder 114 are connected, and the first objective lens 117 having a larger NA is disposed in a proximal end thereof.

In the lens holder 114, the objective lenses 116 and 117 can be controlled in the F-direction by allowing a current to flow so as to generate a Lorentz force in each of the first to forth focusing driving coils 123a, 123b, 123c, and 123d in the same direction based on the focusing error signal (FE signal) outputted from the optical detector for detecting a focusing error (not shown) and a corresponding focusing error detecting circuit (not shown). In this way, a laser beam is focused on the optical disc D.

In the lens holder 114, further, a current is allowed to flow so as to generate opposite forces in the first and third focusing coils 123a and 123c, and in the second and forth focusing coils 123b and 123d based on a tilting signal from a tilt detecting circuit (not shown) to thereby control the rotation of the objective lenses 116 and 117 about the axis Y. In other words, the conventional objective lens actuator 112 includes a tilt driving mechanism which executes rotation of the objective lenses about the Y-direction by the actuator base 120, the first to forth permanent magnets 121a, 121b, 121c, 121d, and the respective focusing driving coils 123a, 123b, 123c, 123d.

In the lens holder 114, a current is allowed to flow so as to generate a Lorentz force in each of the tracking coils 122a and 122b in the same direction based on the tracking error signal (TE signal) outputted from the photo detector for detecting the tracking error (not shown) and the corresponding tracking error detecting circuit (not shown). In this way, a laser beam spot is traceably controlled along a desired track or a train of pits on an optical disc (not shown).

However, according to the above mentioned objective lens actuator 112 including the conventional configuration, the second objective lens 116 used for CD and the first objective lens 117 used for DVD are aligned on the lens holder 114 along the Y-direction in which the wires 118a to 118f extend. The second objective lens 116 having a smaller NA is disposed in the distal end of the wires 118a to 118f with respect to the connection portion at which the wires 118a to 118f and the lens holder 114 are connected, and the first objective lens 117 having a larger NA is disposed in the proximal end thereof.

The wires 118a to 118f usually generate an inherent resonance (called as a pitching resonance, hereinafter) having a secondary bending mode in a range from 1 kHz to 3 kHz. Thus, the lens holder 114 resonates in the direction of rotation in the T-direction at a center where the wires 118a to 118f are connected. A disruption occurs in the gain and phase of a moving frequency response characteristic when the second objective lens 116 or the first objective lens 117 is driven in the F-direction. At this time, the phase of a driving signal for moving one of the second objective lens 116 and the first objective lens 117 shifts to the plus side, and the other to the minus side.

In the frequency region (1 kHz to 3 kHz) in which the pitching resonance occurs, especially, many gain crossovers are set in view of the control design. Accordingly, if the phase shifts to the minus side, it is likely that a sufficient phase margin cannot be ensured to cause a disruption in the focusing control.

For this reason, the conventional objective lens actuator 112 is likely to have unstable recording on and reproducing from an optical disc whose recording density corresponds to one of the second objective lens 116 and the first objective lens 117 arranged along the Y-direction, or be even impossible to perform the recording and reproducing.

In view of the above, the objective lens actuator of the present embodiment is provided with the plurality of objective lenses on the movable body in order to realize a compatible optical disc apparatus which is capable of recording on and reproducing from a plurality of optical discs having different recording densities, and thereby ensures the stable controllability to any optical disc.

Now, a specific configuration of the objective lens actuator 45 according to the first embodiment is described referring to FIGS. 3 and 4. In FIGS. 3 and 4, F indicates the focusing direction (the F-direction), T indicates the tracking direction (the T-direction), Y indicates the tangential direction to the optical disc (the Y-direction), and R indicates the tilting direction which is a direction of rotation about the axis Y. The F-direction, T-direction and Y-direction respectively correspond to the directions of the coordinate axes of a three-dimensional orthogonal coordinate.

The objective lens actuator 45 includes a lens holder 3 made of a resin. The first objective lens 34 (objective lens for the high density) and the second objective lens 41 (objective lens for the low density) are mounted on the lens holder 3. The second objective lens 41 is used for an optical disc having the low recording density, such as CD or DVD. The first objective lens 34 is used for an optical disc having higher information recording density than the optical disc having the low recording density.

The lens holder 3 is mounted with a first printed coil 4 and a second printed coil 5 respectively on the opposite sides in the Y-direction. Terminal plates 8 are mounted on the opposite sides in the T-direction. The second objective lens 41, the first objective lens 34, the lens holder 3, the second printed coil 4, the first printed coil 5, and the terminal plate 8 constitute the movable body.

The second printed coil 4 and the first printed coil 5 are a printed coil which is formed by applying a conductive substance on a substrate in a spiral shape around an axis parallel with the Y-direction to thereby have a coil structure. The second printed coil 4 includes a second focusing coil portion 4a and a second tracking coil portion 4b arranged along the T-direction. The first printed coil 5 includes a first focusing coil portion 5a and a first tracking coil portion 5b arranged along the T-direction.

The second focusing coil portion 4a and the first focusing coil portion 5a are in positions which are opposite to each other with respect to a plane along the Y-direction and perpendicular to the T-direction, and spaced away equal distance from the plane, i.e., are spaced away from each other in the Y-direction. The second tracking coil portion 4b and the first tracking coil portion 5b are in the same positional relationship as the above. Therefore, the second printed coil 4 and the first printed coil 5 can be constructed by the identical parts. These parts are disposed at rotationally symmetrical positions.

The both terminals of the second focusing coil portion 4a and the both terminals of the second focusing coil portion 5a are separately connected to a first driver 17 via the terminal plates 8 and the wires 9. Further, the second tracking coil portion 4b and the first tracking coil portion 5b are connected with each other in series and connected to the first driver 17 via the terminal plates 8 and the wires 9.

In the first magnet 7 and the second magnet 6, four sections defined by two boundaries in the F-direction and the T-direction are oppositely magnetized.

The first magnet 7 faces the first printed coil 5, and is fixedly attached to a first yoke 10a. The first magnet 7 is attached in such a manner that the magnetic boundaries of the first magnet 7 correspond to a center line 5c of the focusing coil portion 5a and a center line of 5d of the tracking coil portion 5b of the first printed coil 5.

The second magnet 6 faces the second printed coil 4, and is fixedly attached to a second yoke 10b. The second magnet 6 is attached in such a manner that the magnetic boundaries of the second magnet 6 correspond to a center line 4c of the focusing coil portion 4a and a center line 4d of the tracking coil portion 4b of the second printed coil 4.

The first magnet 7 and the second magnet 6 are identical to each other in terms of material, shape, magnetization pattern, and magnetic strength. Therefore, the first magnet 7 and the second magnet 6 generate substantially the same magnetic field.

The two terminals of the second focusing coil portion 4a, the two terminals of the first focusing coil portion 5a, and the two terminals of the tracking coil portion 4b and the tracking coil 5b which are series-connected with each other, that is the six terminals, are connected to the distal ends of the six wires 9 via the terminal plates 8. The proximal ends of the wires 9 are fixedly attached to the substrate 13 via a suspension holder 12. The yokes 10a, 10b, the suspension holder 12, and the substrate 13 are fixedly attached to the base 11. The wire 9 has the shape of a slender rod or bar having a circle, substantial polygon, ellipse or the like in the cross section, and is made of an elastic metal such as beryllium copper, phosphor bronze. The supporting center of the wire 9 is substantially identical to the gravity center of the movable body.

The second objective lens 41 and the first objective lens 34 are arranged on the lens holder 3 along the Y-direction. The second objective lens 41 is arranged on a proximal side of the wire 9 with respect to the supporting center of the wire 9. The first objective lens 34 is arranged on a distal side of the wire 9 with respect to the supporting center of the wire 9.

The second printed coil 4 and the second magnet 6 are arranged on the proximal side of the wire 9, the first printed coil 5 and the first magnet 7 are arranged on the distal side of the wire 9. In other words, in the Y-direction, the second printed coil 4 and the second magnet 6 are disposed on the side of the second objective lens 41, and the first printed coil 5 and the first magnet 7 are disposed on the side of the first objective lens 34.

The objective lens actuator 45 performs the driving in such a manner that the moving phase of the second objective lens 41 in the focusing direction delays in comparison to that of the first objective lens 34. Specifically, a gap between the second printed coil 4 and the second magnet 6 is larger than a gap between the first printed coil 5 and the first magnet 7. Accordingly, in the case of applying the electricity to the first focusing coil portion 5a and the second focusing coil portion 4a at the same current value, the driving force generated in the first focusing coil portion 5a is greater than that in the second focusing coil portion 4a, and the phase characteristic of the first objective lens 34 at the pitching resonance frequency always shifts to the plus side. On the contrary, the phase characteristic of the second objective lens 41 at the pitching resonance frequency always shifts to the minus side. As a result, the phase of the driving signal for moving the second objective lens 41 delays against that for the first objective lens 34.

Figure 5:
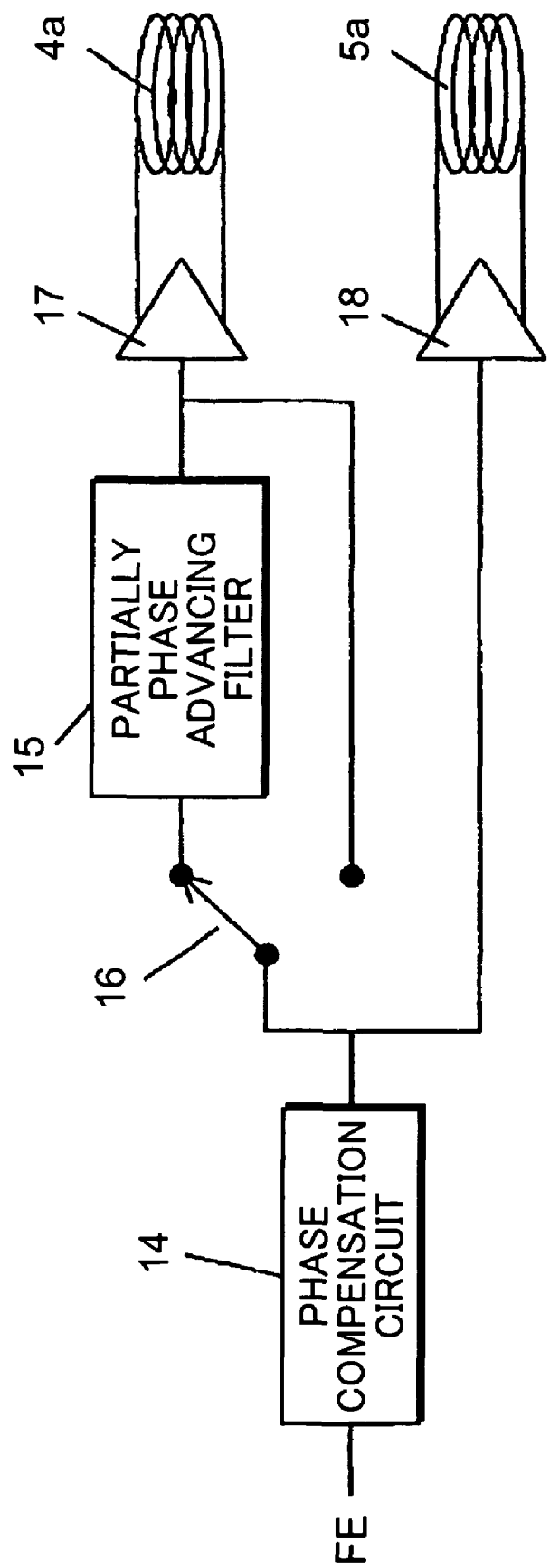
FIG. 5 is a circuit diagram showing a control circuit of the objective lens actuator when conducting recording and reproducing onto and from an optical disc having a low recording density.

In FIG. 5, the reference numeral 14 denotes a phase compensation circuit. The phase compensation circuit 14 is adapted for executing, in the vicinity of a gain crossover, a phase compensation to the focusing error signal FE which is outputted from a focusing detector (not shown) to indicate a distance error between the disc and the objective lenses 34 and 41, and includes two diverged outputs. One of the two outputs is connected to the second focusing coil portion 4a via a switch 16 and the first driver 17 having a signal amplifying function. The switch switches over a route passing a partially phase advancing filter 15 as a phase advancing means and a bypass route bypassing the filter 15. The partially phase advancing filter 15 includes a high-pass filter and a low-pass filter, and is adapted for advancing the phase only at the pitching resonance frequency. The other output is directly connected to the first focusing coil portion 5a via the second driver 18 having a signal amplifying function.

The objective lens actuator configured as above operates as follows.

The gap between the second printed coil 4 and the second magnet 6 is larger than the gap between the first printed coil 5 and the first magnet 7, and the number of magnetic fluxes induced at the second focusing coil portion 4a is thus smaller than those at the first focusing coil portion 5a. Accordingly, in the case of applying the electricity to the second focusing coil portion 4a and the first focusing coil portion 5a at the same current value, the focusing driving force generated at the first focusing coil portion 5a is greater. Thus, the phase at the frequency of causing the pitching resonance in the first objective lens 34 always shifts to the plus side. On the other hand, the phase at the frequency of causing the pitching resonance in the second objective lens 41 shifts to the minus side unless the driving signal is passed through the partially phase advancing filter 15.

Now, in the case of conducting recording or reproducing to an optical disc having a low recording density, such as CD or DVD, as shown in FIG. 5, the switch 16 is set in the route where the output of the phase compensation circuit 14 passes through the partially phase advancing filter 15. Consequently, the phase advancing filter 15a gives a phase and a gain only to the second focusing coil portion 4a so as to shift the phase of the driving signal for the second objective lens 41 to the plus side (advancing) only in the frequency region in which a pitching resonance occurs.

Figure 6:
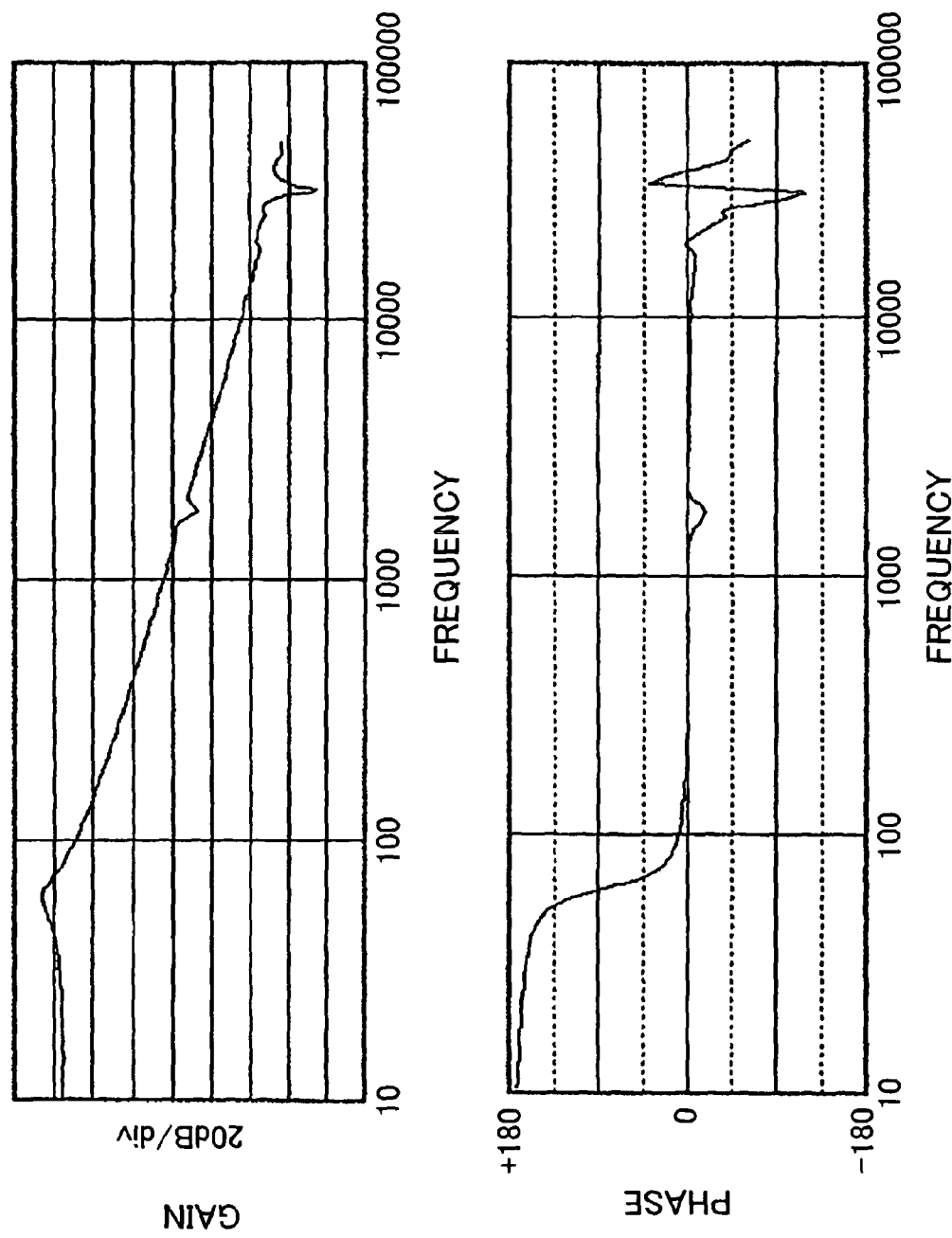
FIG. 6 is a characteristic diagram showing a moving frequency response characteristic of a first objective lens when conducting recording and reproducing onto and from the optical disc having the low recording density.
Figure 7:
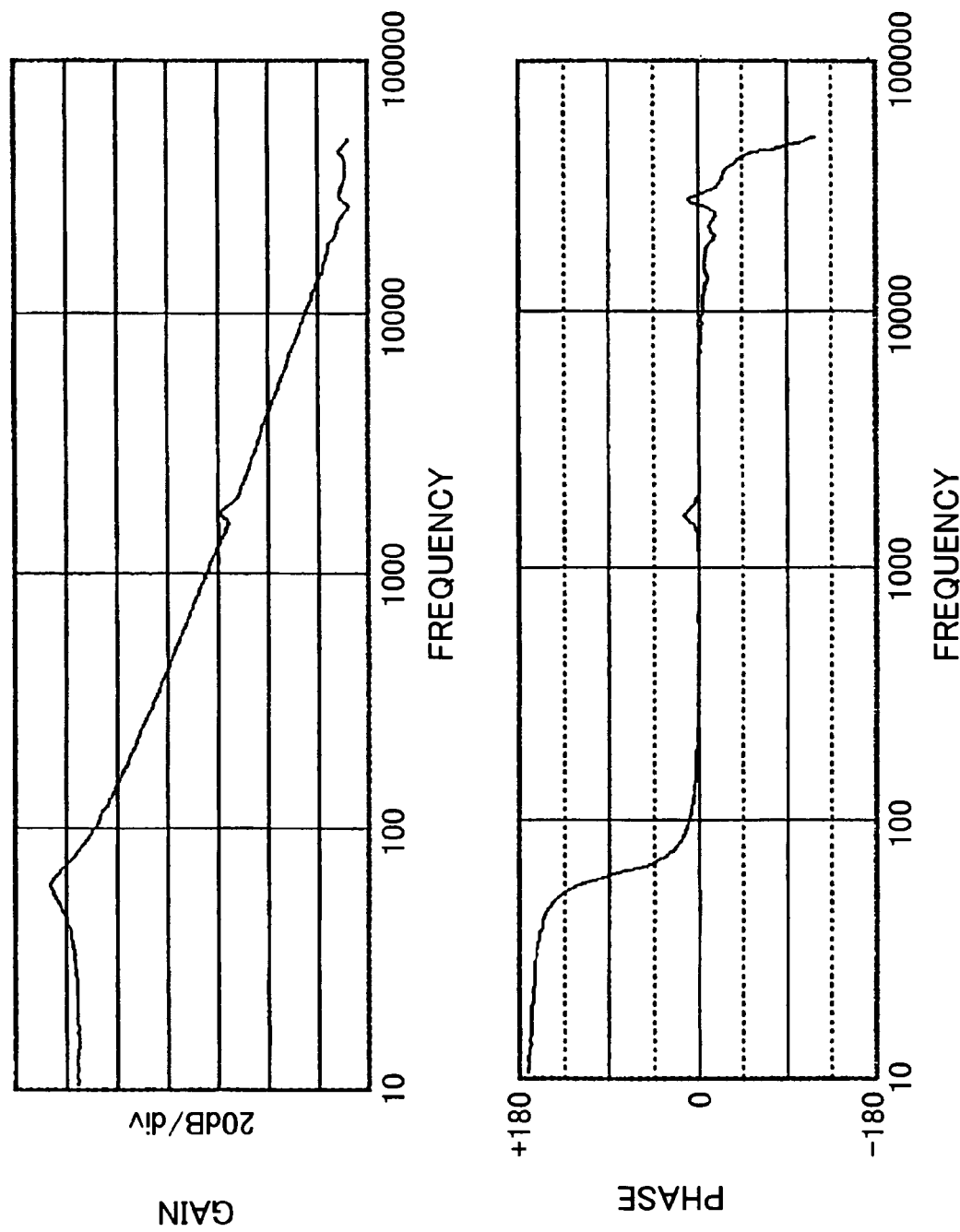
FIG. 7 is a characteristic diagram showing a moving frequency response characteristic of a second objective lens when conducting recording and reproducing onto and from the optical disc having the low recording density.

Accordingly, when conducting recording or reproducing to an optical disc having a low recording density, in the moving phase frequency responding characteristic of the first objective lens 34, as shown in FIG. 6, the phase of the driving signal at the frequency of causing the pitching resonance is shifted to the minus side. On the contrary, in the moving phase frequency responding characteristic of the second objective lens 41, as shown in FIG. 7, the phase of the driving signal at the frequency of causing the pitching resonance is shifted to the plus side. Therefore, a sufficient phase margin can be ensured for the movement of the second objective lens 41 in the focusing direction, and the focusing control of the second objective lens 41 can thus be executed stably without causing the pitching resonance.

Figure 8:
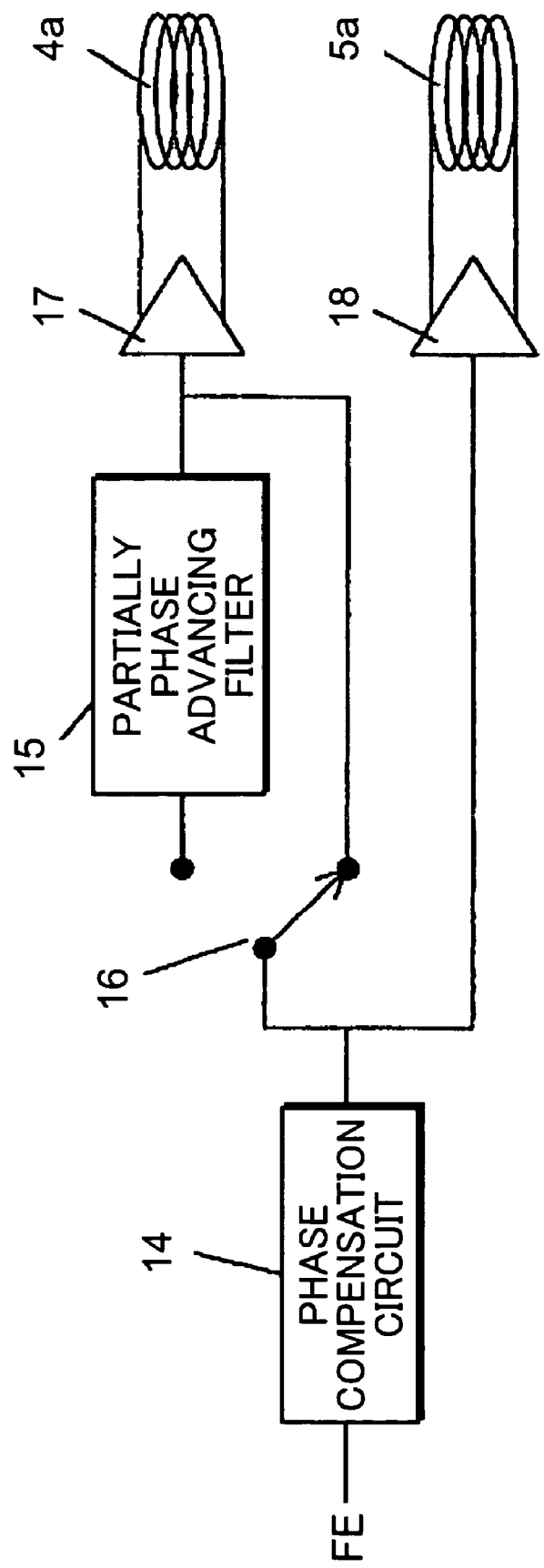
FIG. 8 corresponds to FIG. 5, and shows a condition of conducting recording and reproducing onto and from the optical disc having a high recording density.

Meanwhile, when conducting recording and reproducing to an optical disc having a high recording density, the switch 16 is set in the bypass route where the output of the phase compensation circuit 14 does not pass through the partially phase advancing filter 15, as shown in FIG. 8. In this state, the partially phase advancing filter 15 does not work, and the moving phase frequency responding characteristic of the first objective lens 34 and the second objective lens 41 are shown in FIGS. 9 and 11. In other words, since the phase of the driving signal at the frequency of causing the pitching resonance of the first objective lens 34 shifts to the plus side, a sufficient phase margin can be ensured, and the focusing control of the first objective lens 34 can be thus executed stably without causing the pitching resonance. In this time, for the second objective lens 41, the phase at the frequency of causing the pitching resonance shifts to the minus side.

As described above, in the objective lens actuator 45 of the first embodiment, the phase of the driving signal for moving the second objective lens 41 in the focusing direction is delayed than the phase of the driving signal for moving the first objective lens 34 in the focusing direction. Also, there is the partially phase advancing filter 15 (an example of the phase advancing means) for advancing the phase of the driving signal for moving the second objective lens 41 in the focusing direction in the predetermined frequency region against the phase of the driving signal for moving the first objective lens 34 in the focusing direction, when the second objective lens 41 is under the focusing control. With this arrangement, when conducting recording or reproducing to an optical disc having a high recording density, the phase of the driving signal for moving the second objective lens 41 in the focusing direction is delayed than the phase of the driving signal for moving the first objective lens 34 in the focusing direction in the frequency region in which the pitching resonance occurs. Therefore, a sufficient phase margin can be ensured at the focusing control of the first objective lens 34, and the stable control can thus performed for an optical disc having a high recording density. Further, when conducting recording or reproducing to an optical disc having a low recording density, the phase of the driving signal for moving the second objective lens is actively shifted to the plus side by the partially phase advancing filter 15 in the frequency region in which the pitching resonance occurs. Accordingly, a sufficient phase margin can be ensured, and the stable focusing control can be thus performed for the second objective lens 41 for an optical disc having a low recording density.

As described above, even when the phase shifts to the minus side in the frequency region in which the pitching resonance occurs, namely 1 kHz to 3 kHz, the phase characteristic is compensated so as to shift to the plus side by the phase advancing means, thereby ensuring the sufficient phase margin. Therefore, the focusing control can be conducted stably without causing the pitching resonance. In the objective lens actuator 45 including the plural objective lenses 34 and 41 mounted on the movable body to realize a compatible optical disc apparatus capable of recording or reproducing to a plurality of optical discs having different recording densities from one another, thus, the stable focusing control performance can be accomplished for an optical disc having any recording density.

According to the first embodiment, the second objective lens 41 is arranged along a radial line passing the center of an optical disc. In the proximal side of the wire 9 with respect to the line, the second printed coil 4, the second magnet 6, the second yoke 10b, the suspension holder 12, and the substrate 13 are arranged. In the distal side of the wire 9 with respect to the line, the first objective lens 34, the first printed coil 5, the first magnet 7, and the first yoke 10a are arranged. Consequently, the objective lens actuator 45 has substantially symmetrical dimension in the Y-direction with respect to the line, thus providing an improved balance. In recording or reproducing to an optical disc accommodated in a cartridge casing, an opening formed in the cartridge casing is substantially symmetry with respect to the radial line passing the center of the optical disc, thereby improving the efficiency with respect to the opening, and provided a sufficient space for the magnetic circuit and the lens holder. Thus, greater driving force and higher rigidity ensuring broader bands can be realized.

The second focusing coil portion 4a and the first focusing coil portion 5a are separately driven. Further, the second focusing coil portion 4a and the first focusing coil portion 5a are arranged in such positions that they are spaced away in the opposite directions an equal distance from a plane which extends along the Y-direction and is perpendicular to the T-direction, and spaced away from each other in the Y-direction. Therefore, the driving in the tilting direction (R-direction) can be accomplished. The driving in the R-direction is conducted to absorb a warp of an optical disc, a tilting of the driving mechanism, and an initial coma aberration of the optical disc. The frequency is in a region of 100 Hz or less. Accordingly, the partially phase advancing filter 15 which operates in the pitching resonance frequency region will not receive an adverse influence.

In this embodiment, in order to make the phase of the driving signal for moving the second objective lens 41 in the focusing direction later than that for the first objective lens 34, the gap between the second printed coil 4 and the second magnet 6 is made to be larger than the gap between the first printed coil 5 and the first magnet 7. However, the present invention is not limited to this arrangement. For example, the following configurations may also be adopted: a configuration in which the gravity center of the movable body is placed at a position closer to the second objective lens 41 in the Y-direction, i.e., a position closer to the second focusing coil portion 4a; a configuration in which the second magnet 6 is made to be thinner than the first magnet 7; a configuration in which the second magnet 6 is made of a material having a lower residual flux density; or a configuration in which the second magnet 6 is magnetized less than the first magnet 7 to thereby generate a smaller magnetic field than the first magnet 7.

Further, apart from the present embodiment, the switch 16 and the partial phase advancing filter 15 as the phase advancing means may be connected to the first focusing coil portion 5a, and the phase of the driving signal for moving the first objective lens 34 in the focusing direction may be delayed than the phase of the driving signal for moving the second objective lens 41 in the focusing direction. For example, this can be accomplished by: making the gap between the first printed coil 5 and the first magnet 7 larger than the gap between the second printed coil 4 and the second magnet 6; placing the gravity center of the movable body at a position closer to the first objective lens 34 in the Y-direction, i.e., a position closer to the first focusing coil portion 5a; making the thickness of the first magnet 7 thinner than the second magnet 6; making the first magnet 7 of a material having a lower residual flux density; or magnetizing the first magnet 7 in a smaller strength to thereby generate a smaller magnetic field than the second magnet 6.

Second Embodiment

Figure 12:
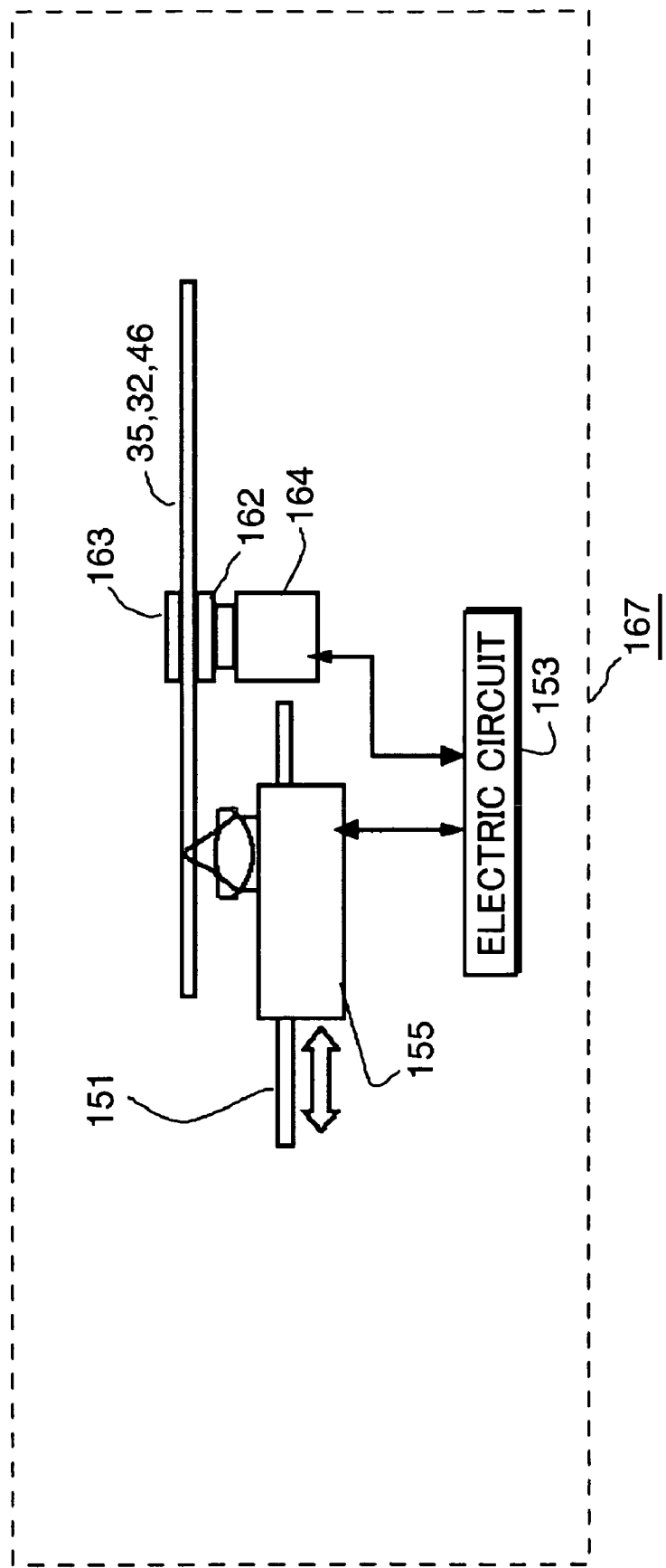
FIG. 12 is a diagram schematically showing a configuration of an optical information apparatus according to a second embodiment of the present invention.

FIG. 12 schematically shows an optical information apparatus 167 according to an embodiment of the present invention. The optical head apparatus 155 described in the first embodiment is provided in the optical information apparatus 167. In FIG. 12, the optical disc 35 (or the optical disc 32 or 46, hereinafter the same as the above) is mounted on a turn table 162 to be held by the turn table 162 and a clamper 163, and rotated by a motor 164. The optical head apparatus 155 is moved by a driving device 151 of the optical head apparatus to a track in the optical disc 35 where the desired information exists.

Then, the optical head apparatus 155 responds to a positional relationship with the optical head disc 35, and sends the focusing error (an error in a focusing point) signal or the tracking error signal to an electric circuit 153. The electric circuit 153 responds to the signal and sends a signal for slightly moving the objective lens to the optical head apparatus 155. In accordance with the signal, the optical head apparatus 155 executes the focusing control and the tracking control to the optical disc so as to read, write (record) or delete the information.

In the optical information apparatus 167 of the present embodiment, the optical head apparatus according to the first embodiment is used. Therefore, the optical information apparatus 167 has an effect that the single optical head apparatus can address a plurality of optical discs having the different recording densities from one another.

Third Embodiment

Figure 13:
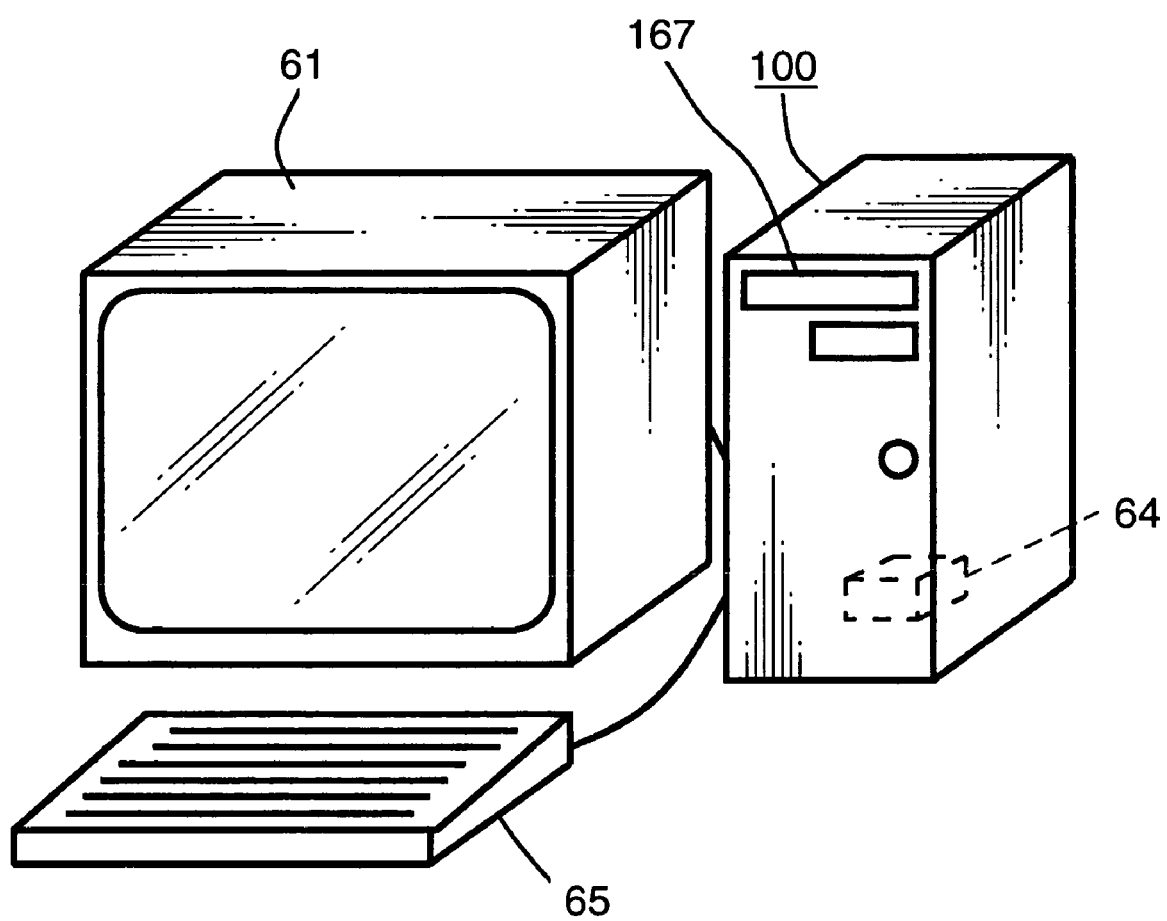
FIG. 13 is a perspective view schematically showing a configuration of a computer according to a third embodiment of the present invention.

FIG. 13 shows an appearance of the computer 100 provided with the optical information apparatus 167 described in the second embodiment.

The computer 100 is provided with the optical information apparatus 167, an input device 65, such as a keyboard, a mouse, or a touch screen for inputting the information, a calculating device 64, such as a central processing unit (CPU)

for operating a calculation based on the information inputted by the input device 65 or the information read from the optical information apparatus 167, and an output device 61, such as a Braun tube, a liquid crystal display device, or a printer for displaying the information such as a result calculated by the calculating device 64.

Fourth Embodiment

Figure 14:
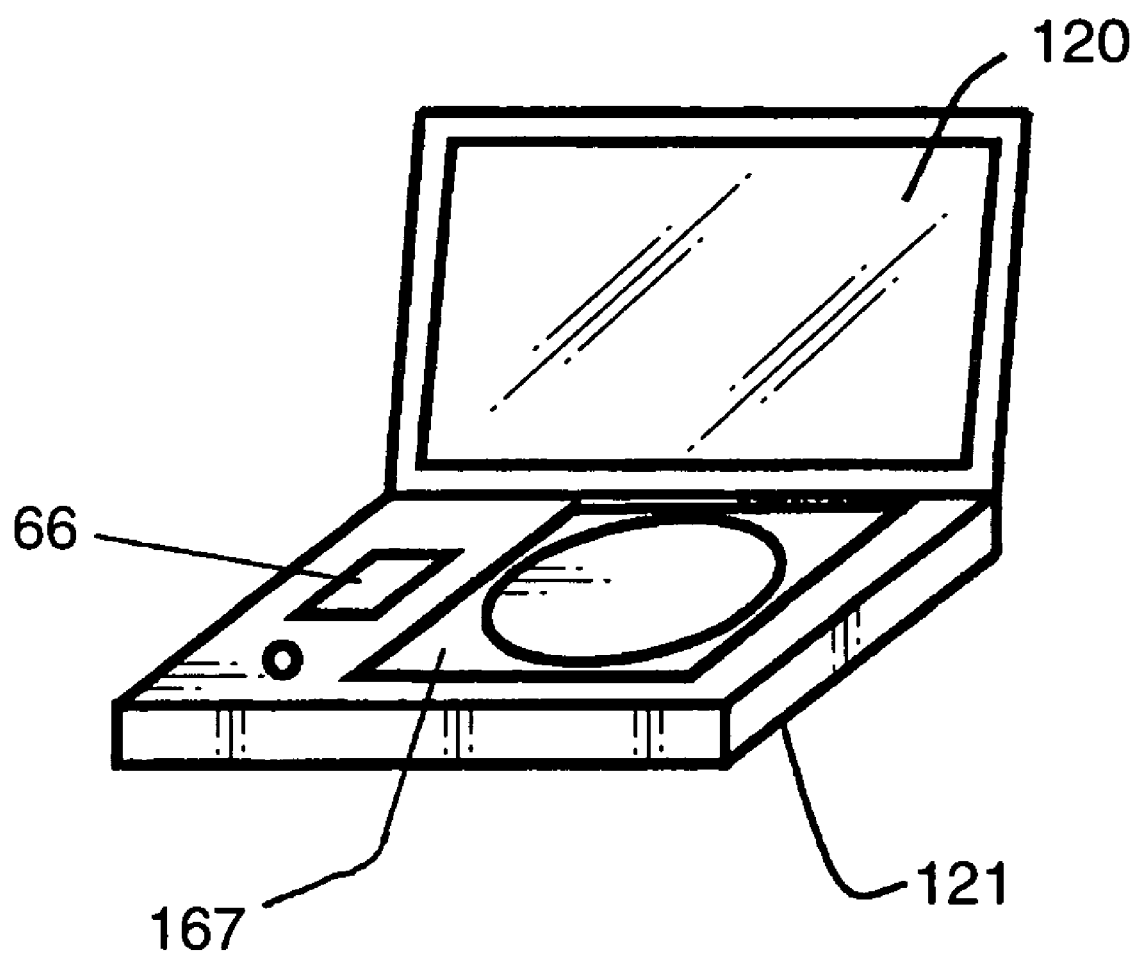
FIG. 14 is a perspective view schematically showing a configuration of an optical disc player according to a fourth embodiment of the present invention.

FIG. 14 shows an optical disc player 121 provided with the optical information apparatus 167 described in the second embodiment.

The optical disc player 121 is provided with the optical information apparatus 167, and an information-to-image converting device 66 (for example, a decoder) for converting an information signal obtained from the optical information apparatus 167 to an image. The present configuration can be used as a car navigation system. Further, a displaying device 120 such as a liquid crystal monitor can be mounted in the configuration.

Fifth Embodiment

Figure 15:
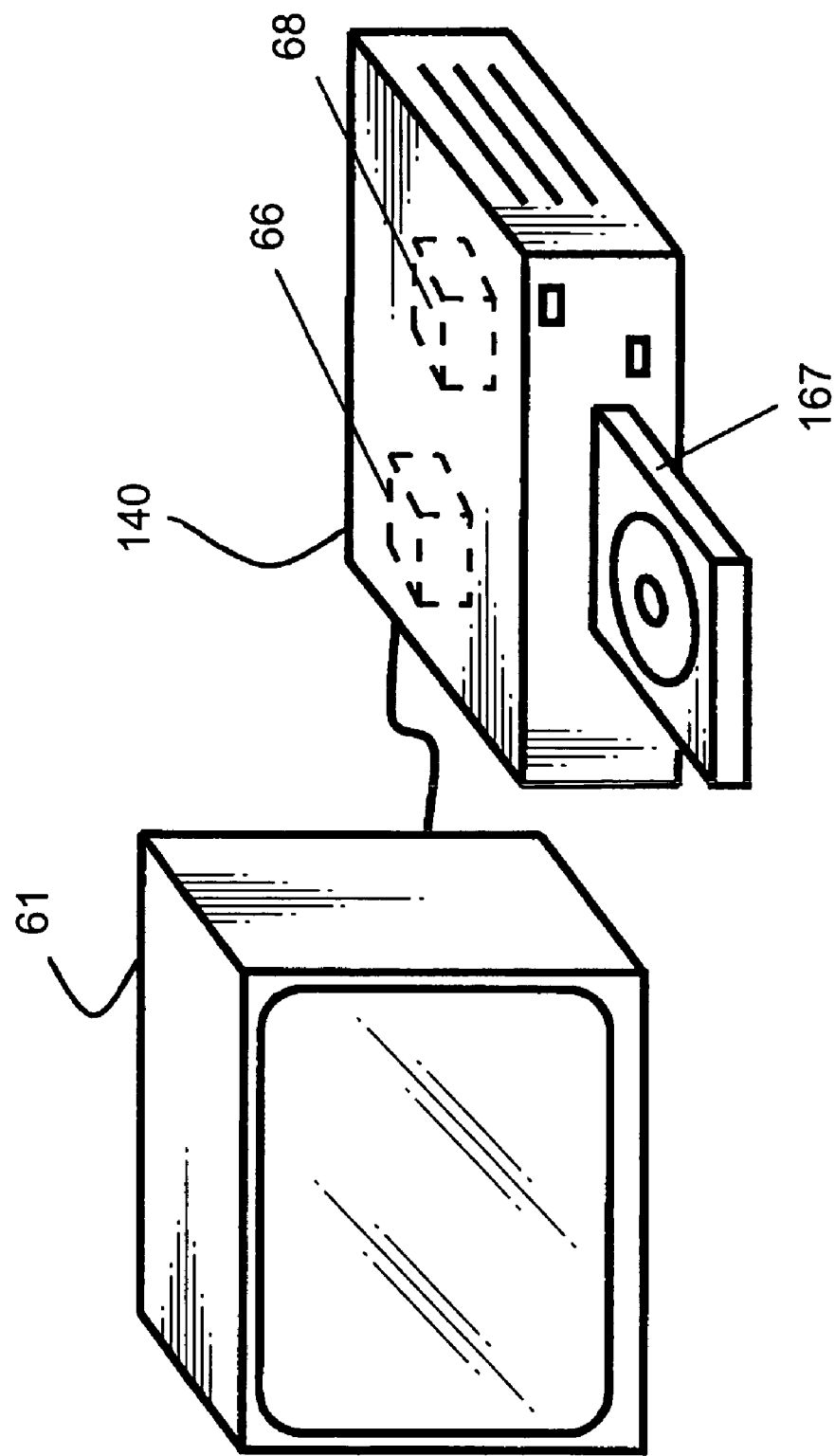
FIG. 15 is a perspective view schematically showing a configuration of an optical disc recorder according to a fifth embodiment of the present invention.

FIG. 15 shows an optical disc recorder 140 provided with the optical information apparatus 167 described in the second embodiment.

The optical disc recorder 140 is provided with the optical information apparatus 167, and an image-to-information converting device 68 (for example, an encoder) for converting the image information to the information to be recorded in the optical disc by the optical information apparatus 167. It is preferable that the optical disc recorder 140 is also provided with the information-to-image converting device 66 (the decoder) for converting the information signal obtained from the optical information apparatus 167 to the image. With this arrangement, a reproduction of information which has already been recorded can be accomplished. Further, the optical disc recorder 140 can be provided with the output device 61 for displaying the information, such as the Braun tube, the liquid crystal displaying device, or the printer.

Sixth Embodiment

Figure 16:
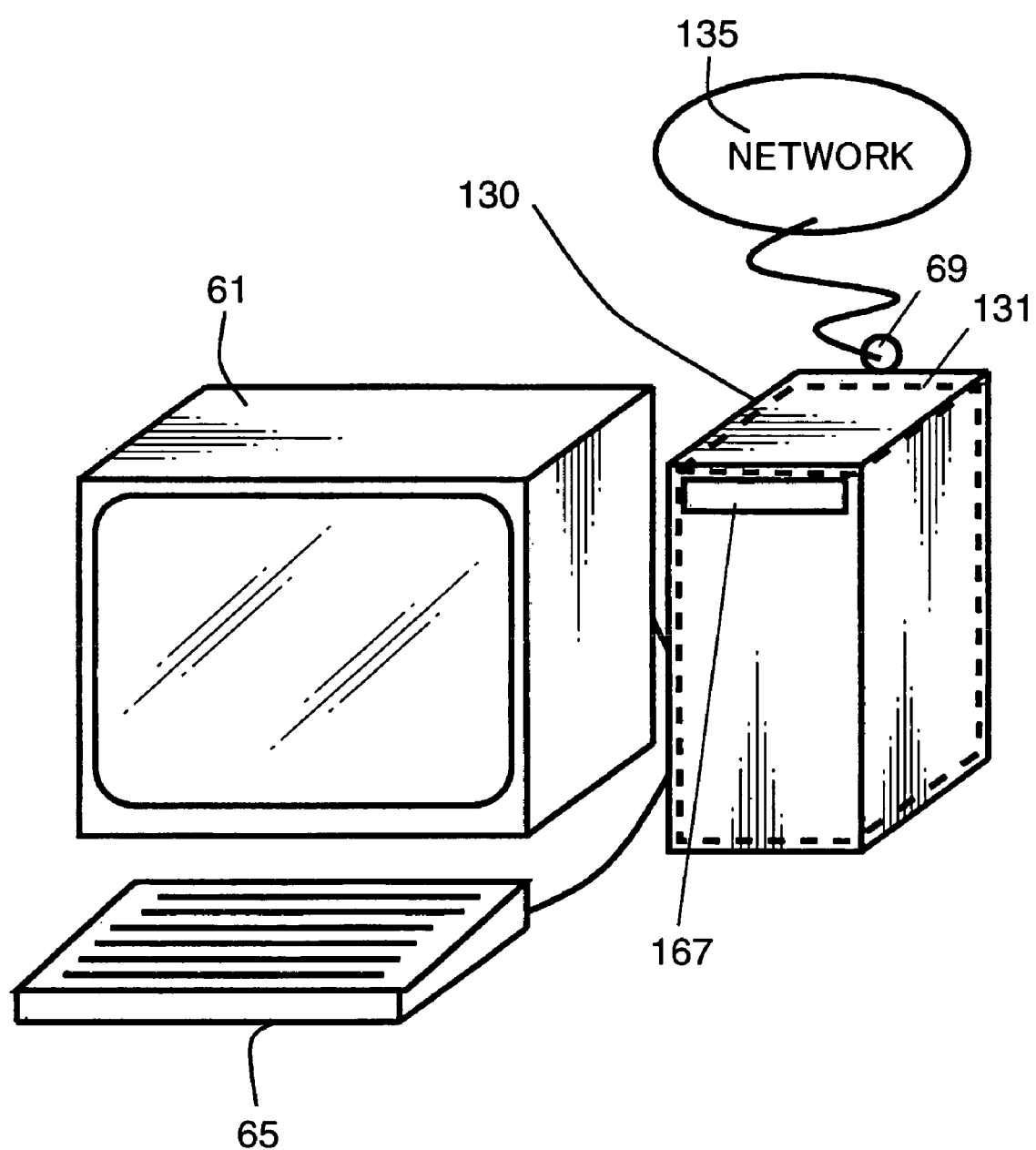
FIG. 16 is a perspective view schematically showing a configuration of an optical disc server according to a sixth embodiment of the present invention.
Figure 17:
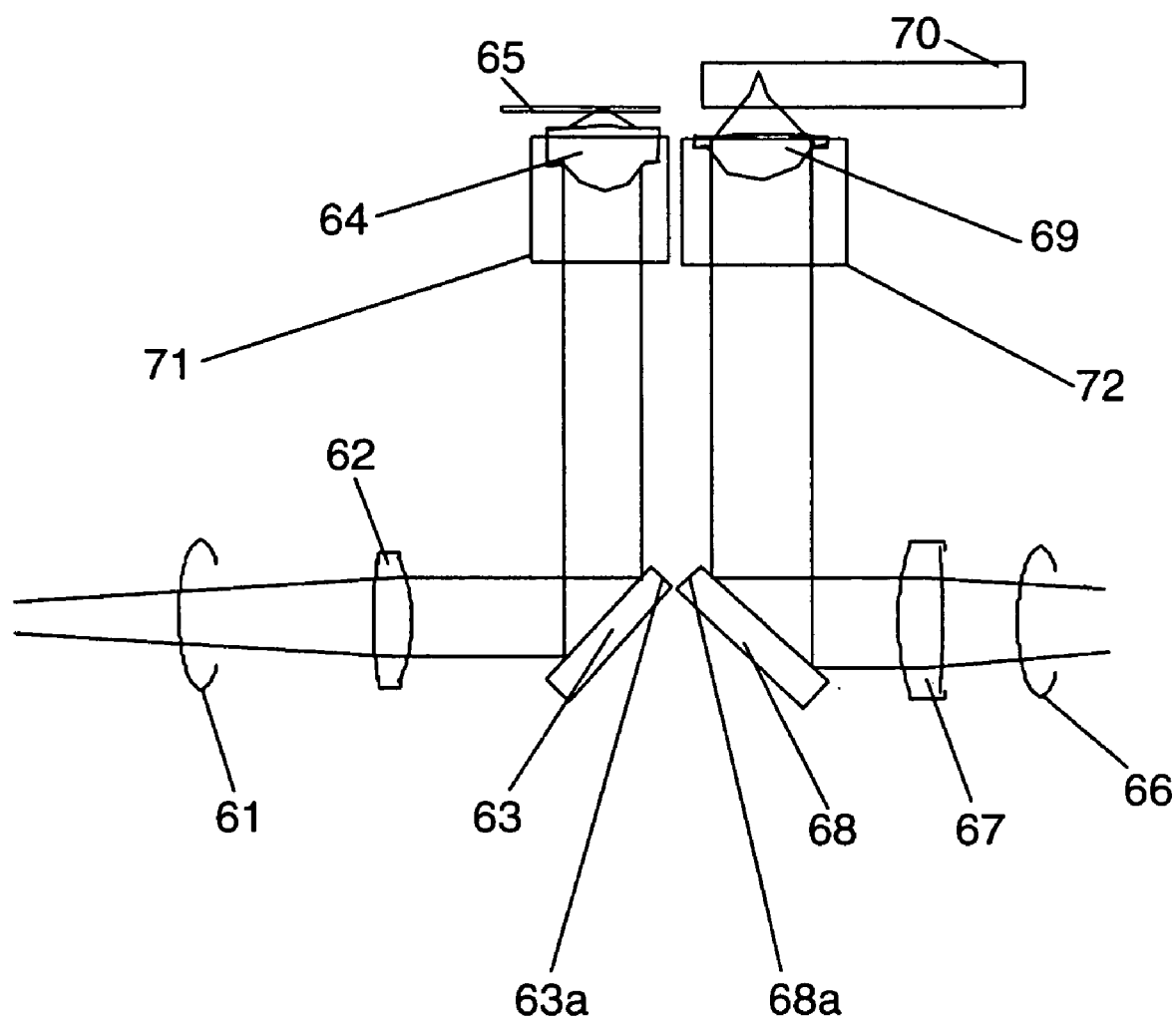
FIG. 17 is a side view schematically showing a conventional optical head apparatus.

FIG. 16 shows an information server 130 (an optical disc server) provided with the optical information apparatus 167 described in the second embodiment. An input-output terminal 69 is a wired or a wireless input-output terminal for taking the information to be recorded in the optical information apparatus 167 in, or for outputting the information which is read by the optical information apparatus 167 to an outside. With this arrangement, the information can be exchanged via a network 135 over a plurality of units, such as a computer, telephone, television tuner, while the information server 130 can be utilized as a common information server (the optical disc server) among the plural units. Further, the information server 130 can execute the recording or reproducing to the different kind of optical discs stably. Thus, the information server 130 is effectively used in various ways.

Further, the information server 130 can be provided with the output device 61 for displaying the information, such as the Braun tube, liquid crystal displaying device, or printer. In a case of providing with a changer 131 for taking out or putting into the plural optical discs with respect to the optical information apparatus 167, more information can be effectively recorded and accumulated.

The stable recording or reproducing to the different kind of optical discs can be executed by the computer, the optical disc player, the optical disc recorder, the optical disc server, or the car navigation system, which are provided with the optical information apparatus according to the above embodiments or which adopt the above recording or reproducing method, to thereby obtain an effect that these units can be used in various ways.

Further, in the above third to sixth embodiments, the output device 61 or the liquid crystal monitor 120 are shown in FIGS. 13 to 16. However, it is needless to say that there can be an embodiment which does not adopt the output device 61 or the liquid crystal monitor 120, but includes an output terminal as alternated. In FIGS. 14 and 15, no input device is illustrated. However, an embodiment in which the input device, such as a keyboard, a touch screen, a mouse, or a remote control device is adopted can be available. On the other hand, in the third to sixth embodiments, an embodiment which does not adopt the input device, but adopts only the input terminal can be available.

INDUSTRIAL APPLICABILITY

An optical head apparatus according to the present invention can be used as an optical head apparatus, optical information apparatus, and an application system thereof which include a plurality of objective lenses to realize a compatible optical information apparatus which is capable of conducting a recording or reproducing to plural of optical discs having a recording density different from one another.

The invention claimed is:
1. An optical head apparatus comprising:
   a first optical system including a first light source and a first objective lens for focusing a first light beam emitted from the first light source upon a first optical disc;
   a second optical system including a second light source emitting a second light beam having a wavelength longer than the first light source and a second objective lens for focusing the second light beam emitted from the second light source upon a second optical disc;
   a first reflecting surface for deflecting the first light beam and guiding the first light beam toward the first objective lens in the first optical system; and
   a second reflecting surface for deflecting the second light beam and guiding the second light beam toward the second objective lens in the second optical system;
   wherein the second optical disc has an information recording density smaller than the first optical disc,
   the first objective lens and the second objective lens are arranged along a tangential direction to a track on an optical disc, and
   the second objective lens is disposed on a line substantially passing a center of the optical disc, and the first objective lens is disposed at a position out of the line.

2. An optical head apparatus according to claim 1, wherein the first reflecting surface and the second reflecting surface are arranged so as to deflect a light beam traveling from the first light source to the first reflecting surface and a light beam traveling from the second light source to the second reflecting surface, to which are opposite and substantially parallel, in such a way to propagate from the respective reflecting surfaces substantially in parallel to each other.

3. An optical head apparatus according to claim 1, wherein the deflecting element includes a triangle prism.

4. An optical head apparatus according to claim 1, wherein the light beam from the second light source is irradiated upon a DVD.

5. An optical head apparatus according to claim 1, wherein the second objective lens is thinner than the first objective lens.

6. An optical head apparatus according to claim 1, wherein the first objective lens has an outer diameter smaller than the second objective lens.

7. An optical head apparatus according to claim 1, further comprising:
- a first diverging element for deflecting a light beam traveling from the first light source to the deflecting element to a direction substantially parallel to the optical disc; and
- a second diverging element for deflecting a light beam traveling from the second light source to the deflecting element to a direction substantially parallel to the optical disc.

8. An optical head apparatus according to claim 7, further comprising:
- a light detector disposed opposite to the first light source with respect to the first diverging element in the first optical system,
- wherein the first diverging element includes a first reflecting surface for reflecting the light beam from the first light source to the deflecting element and a second reflecting surface for reflecting the light beam from the deflecting element to the light detector.

9. An optical head apparatus according to claim 1, further comprising a deflecting element, the first reflecting surface and the second reflecting surface being integrally formed with the deflecting element.

10. An optical head apparatus comprising:
- a first optical system including a first light source and a first objective lens for focusing a first light beam emitted from the first light source upon a first optical disc;
- a second optical system including a second light source emitting a second light beam having a wavelength longer than the first light source and a second objective lens for focusing the second light beam emitted from the second light source upon a second optical disc;
- a first reflecting surface for deflecting the first light beam and guiding the first light beam toward the first objective lens in the first optical system; and
- a second reflecting surface for deflecting the second light beam and guiding the second light beam toward the second objective lens in the second optical system;
- wherein the second optical disc has an information recording density smaller than the first optical disc,
- the first objective lens and the second objective lens are arranged along a tangential direction to a track on an optical disc, and
- the second optical system further includes a third light source emitting a light beam having a wavelength longer than the second light source.

11. An optical head apparatus according to claim 10, further comprising a deflecting element, the first reflecting surface and the second reflecting surface being integrally formed with the deflecting element.

12. An optical head apparatus comprising:
- a first optical system including a first light source and a first objective lens for focusing a first light beam emitted from the first light source upon a first optical disc;
- a second optical system including a second light source emitting a second light beam having a wavelength longer than the first light source and a second objective lens for focusing the second light beam emitted from the second light source upon a second optical disc;
- a first reflecting surface for deflecting the first light beam and guiding the first light beam toward the first objective lens in the first optical system;
- a second reflecting surface for deflecting the second light beam and guiding the second light beam toward the second objective lens in the second optical system; and
- an objective lens actuator including;
  - a base;
  - a movable body for holding the first objective lens and the second objective lens;
  - a slender elastic support member for movably supporting the movable body movable in a focusing direction and a tracking direction with respect to the base;
  - a first focusing driver for driving the first objective lens in the focusing direction;
  - a second focusing driver for driving the second objective lens in the focusing direction;
  - a first tracking driver for driving the first objective lens in the tracking direction; and
  - a second tracking driver for driving the second objective lens in the tracking direction;
    - wherein the slender elastic supporting member extends in a tangential direction to the optical disc;
- wherein the second optical disc has an information recording density smaller than the first optical disc, and
- the first objective lens and the second objective lens are arranged along a tangential direction to a track on an optical disc.

13. An optical head apparatus according to claim 12, wherein
- the first focusing driver includes a first focusing coil mounted on a first objective lens side of the movable body, and a first magnet fixedly attached to the base in a position opposite to the first focusing coil, and
- the second focusing driver includes a second focusing coil mounted on a second objective lens side of the movable body and a second magnet fixedly attached to the base in a position opposite to the second focusing coil.

14. An optical head apparatus according to claim 13, wherein the objective lens actuator is set so as to make the phase of a driving signal for moving the second objective lens in the focusing direction later than that for the first objective lens, and includes a phase advancing device for advancing the phase of the driving signal for moving the second objective lens in the focusing direction against that for the first objective lens in a predetermined frequency region when focus control is executed to the second objective lens.

15. An optical head apparatus according to claim 14, wherein the phase advancing device includes a phase filter which advances a phase of a driving signal supplied to the focusing coil in the second focusing driver in a predetermined frequency region.

16. An optical head apparatus according to claim 15, wherein the phase filter includes a combination of a high-pass filter and a low-pass filter for advancing the phase of the driving signal within a predetermined frequency region.

17. An optical head apparatus according to claim 14, wherein the predetermined frequency region is a frequency region where an inherent resonance of the slender elastic support member occurs.

18. An optical head apparatus according to claim 14, wherein the movable body is so disposed that the gravity center of the movable body is closer to the first focusing coil than the second focusing coil along the tangential direction to delay the moving phase of the second objective lens in the focusing direction.

19. An optical head apparatus according to claim 14, wherein a gap between the second focusing coil and the second magnet is set so as to be greater than a gap between the first focusing coil and the first magnet to delay the phase of the driving signal for moving the second objective lens in the focusing direction.

20. An optical head apparatus according to claim 13, wherein the objective lens actuator is configured so as to make the phase of a driving signal for moving the first objective lens in the focusing direction later than that for the second objective lens, and includes a phase advancing device for advancing the phase of the driving signal for moving the first objective lens in the focusing direction against that for the second objective lens in a predetermined frequency region when focus control is executed to the first objective lens.

21. An optical head apparatus according to claim 20, wherein the phase advancing device includes a phase filter which advances a phase of the driving signal supplied to a focusing coil in the first focusing driver within a predetermined frequency region.

22. An optical head apparatus according to claim 20, wherein the movable body is so disposed that the gravity center of the movable body is closer to the second focusing coil than the first focusing coil along the tangential direction to delay the moving phase of the first objective lens in the focusing direction.

23. An optical head apparatus according to claim 20, wherein a gap between the first focusing coil and the first magnet is set so as to be greater than a gap between the second focusing coil and the second magnet to delay the moving phase of the first objective lens in the focusing direction.

24. An optical head apparatus according to claim 20, wherein a magnetic field of the first magnet is generated so as to be smaller than that of the second magnet to delay the phase of the driving signal for moving the first objective lens in the focusing direction.

25. An optical head apparatus according to claim 20, wherein a magnetic field of the second magnet is generated so as to be smaller than that of the first magnet to delay the phase of the driving signal for moving the second objective lens in the focusing direction.

26. An optical head apparatus according to claim 13, wherein
the first focusing coil and the second focusing coil are disposed in both sides of a plane passing a gravity center of the movable body and perpendicular to the tracking direction, and
the movable body is tiltable about an axis extending along the tangential direction by adjusting an electric current supplied to the first focusing coil and the second focusing coil.

27. An optical head apparatus according to claim 12, further comprising a deflecting element, the first reflecting surface and the second reflecting surface being integrally formed with the deflecting element.

28. An optical information apparatus comprising:
an optical head apparatus including:
a first optical system including a first light source and a first objective lens for focusing a first light beam emitted from the first light source upon a first optical disc,
a second optical system including a second light source emitting a second light beam having a wavelength longer than the first light source and a second objective lens for focusing the second light beam emitted from the second light source upon a second optical disc,
a first reflecting surface for deflecting the first light beam and guiding the first light beam toward the first objective lens in the first optical system, and
a second reflecting surface for deflecting the second light beam and guiding the second light beam toward the second objective lens in the second optical system,
wherein the second optical disc has an information recording density smaller than the first optical disc, the first objective lens and the second objective lens are arranged along a tangential direction to a track on an optical disc, the second objective lens is disposed on a line substantially passing a center of the optical disc, and the first objective lens is disposed at a position out of the line;
a motor for rotating the optical disc; and
a control circuit for receiving a signal from the optical head apparatus to control drive of the optical head apparatus and the motor based on the signal.

29. A computer comprising:
an optical information apparatus having:
an optical head apparatus including:
a first optical system including a first light source and a first objective lens for focusing a first light beam emitted from the first light source upon a first optical disc,
a second optical system including a second light source emitting a second light beam having a wavelength longer than the first light source and a second objective lens for focusing the second light beam emitted from the second light source upon a second optical disc,
a first reflecting surface for deflecting the first light beam and guiding the first light beam toward the first objective lens in the first optical system, and
a second reflecting surface for deflecting the second light beam and guiding the second light beam toward the second objective lens in the second optical system,
wherein the second optical disc has an information recording density smaller than the first optical disc, the first objective lens and the second objective lens are arranged along a tangential direction to a track on an optical disc, the second objective lens is disposed on a line substantially passing a center of the optical disc, and the first objective lens is disposed at a position out of the line;
a motor for rotating the optical disc; and
a control circuit for receiving a signal from the optical head apparatus to control drive of the optical head apparatus and the motor based on the signal;
an input device or input terminal for inputting information;
a calculating device for calculating based on information inputted by the input device or information reproduced by the optical information apparatus; and
an output device or an output terminal for displaying or outputting information inputted by the input device, information reproduced by the optical information apparatus, or a result calculated by the calculating device.

30. An optical disc player comprising:
an optical information apparatus having:
an optical head apparatus including:
a first optical system including a first light source and a first objective lens for focusing a first light beam emitted from the first light source upon a first optical disc,
a second optical system including a second light source emitting a second light beam having a wavelength longer than the first light source and a second objective lens for focusing the second light beam emitted from the second light source upon a second optical disc, a first reflecting surface for deflecting the first light beam and guiding the first light beam toward the first objective lens in the first optical system, and a second reflecting surface for deflecting the second light beam and guiding the second light beam toward the second objective lens in the second optical system, wherein the second optical disc has an information recording density smaller than the first optical disc, the first objective lens and the second objective lens are arranged along a tangential direction to a track on an optical disc, the second objective lens is disposed on a line substantially passing a center of the optical disc, and the first objective lens is disposed at a position out of the line;

a motor for rotating the optical disc; and a control circuit for receiving a signal from the optical head apparatus to control drive of the optical head apparatus and the motor based on the signal; and an information-to-image decoder for converting an information signal generated by the optical information apparatus to an image.

31. A car navigation system comprising:

an optical information apparatus having:

an optical head apparatus including:

a first optical system including a first light source and a first objective lens for focusing a first light beam emitted from the first light source upon a first optical disc, a second optical system including a second light source emitting a second light beam having a wavelength longer than the first light source and a second objective lens for focusing the second light beam emitted from the second light source upon a second optical disc, a first reflecting surface for deflecting the first light beam and guiding the first light beam toward the first objective lens in the first optical system, and a second reflecting surface for deflecting the second light beam and guiding the second light beam toward the second objective lens in the second optical system, wherein the second optical disc has an information recording density smaller than the first optical disc, the first objective lens and the second objective lens are arranged along a tangential direction to a track on an optical disc, the second objective lens is disposed on a line substantially passing a center of the optical disc, and the first objective lens is disposed at a position out of the line;

a motor for rotating the optical disc; and a control circuit for receiving a signal from the optical head apparatus to control drive of the optical head apparatus and the motor based on the signal; and an information-to-image decoder for converting the information signal generated by the optical information apparatus to an image.

32. An optical disc recorder comprising:

an optical information device having:

an optical head apparatus including:

a first optical system including a first light source and a first objective lens for focusing a first light beam emitted from the first light source upon a first optical disc, a second optical system including a second light source emitting a second light beam having a wavelength longer than the first light source and a second objective lens for focusing the second light beam emitted from the second light source upon a second optical disc, a first reflecting surface for deflecting the first light beam and guiding the first light beam toward the first objective lens in the first optical system, and a second reflecting surface for deflecting the second light beam and guiding the second light beam toward the second objective lens in the second optical system, wherein the second optical disc has an information recording density smaller than the first optical disc, the first objective lens and the second objective lens are arranged along a tangential direction to a track on an optical disc, the second objective lens is disposed on a line substantially passing a center of the optical disc, and the first objective lens is disposed at a position out of the line;

a motor for rotating the optical disc; and a control circuit for receiving a signal from the optical head apparatus to control drive of the optical head apparatus and the motor based on the signal; and an image-to-information encoder for converting image information to information to be recorded by the optical information apparatus.

33. An optical disc server comprising:

an optical information apparatus having:

an optical head apparatus including:

a first optical system including a first light source and a first objective lens for focusing a first light beam emitted from the first light source upon a first optical disc, a second optical system including a second light source emitting a second light beam having a wavelength longer than the first light source and a second objective lens for focusing the second light beam emitted from the second light source upon a second optical disc, a first reflecting surface for deflecting the first light beam and guiding the first light beam toward the first objective lens in the first optical system, and a second reflecting surface for deflecting the second light beam and guiding the second light beam toward the second objective lens in the second optical system, wherein the second optical disc has an information recording density smaller than the first optical disc, the first objective lens and the second objective lens are arranged along a tangential direction to a track on an optical disc, the second objective lens is disposed on a line substantially passing a center of the optical disc, and the first objective lens is disposed at a position out of the line;

a motor for rotating the optical disc; and a control circuit for receiving a signal from the optical head apparatus to control drive of the optical head apparatus and the motor based on the signal; and an input-output terminal for allowing information communication with outside.

34. An optical information apparatus comprising:

an optical head apparatus comprising:
- a first optical system including a first light source and a first objective lens for focusing a first light beam emitted from the first light source upon a first optical disc;
- a second optical system including a second light source emitting a second light beam having a wavelength longer than the first light source and a second objective lens for focusing the second light beam emitted from the second light source upon a second optical disc;
- a first reflecting surface for deflecting the first light beam and guiding the first light beam toward the first objective lens in the first optical system; and
- a second reflecting surface for deflecting the second light beam and guiding the second light beam toward the second objective lens in the second optical system;
- wherein the second optical disc has an information recording density smaller than the first optical disc, the first objective lens and the second objective lens are arranged along a tangential direction to a track on an optical disc, and the second optical system further includes a third light source emitting a light beam having a wavelength longer than the second light source;

a motor for rotating the optical disc; and a control circuit for receiving a signal from the optical head apparatus to control drive of the optical head apparatus and the motor based on the signal.

35. An optical information apparatus comprising:

an optical head apparatus including a first optical system including a first light source and a first objective lens for focusing a first light beam emitted from the first light source upon a first optical disc;

a second optical system including a second light source emitting a second light beam having a wavelength longer than the first light source and a second objective lens for focusing the second light beam emitted from the second light source upon a second optical disc;

a first reflecting surface for deflecting the first light beam and guiding the first light beam toward the first objective lens in the first optical system;

a second reflecting surface for deflecting the second light beam and guiding the second light beam toward the second objective lens in the second optical system; and an objective lens actuator including;
- a base;
- a movable body for holding the first objective lens and the second objective lens;
- a slender elastic support member for movably supporting the movable body movable in a focusing direction and a tracking direction with respect to the base;
- a first focusing driver for driving the first objective lens in the focusing direction;
- a second focusing driver for driving the second objective lens in the focusing direction;
- a first tracking driver for driving the first objective lens in the tracking direction; and
- a second tracking driver for driving the second objective lens in the tracking direction;
- wherein the slender elastic supporting member extends in a tangential direction to the optical disc;

wherein the second optical disc has an information recording density smaller than the first optical disc, and the first objective lens and the second objective lens are arranged along a tangential direction to a track on an optical disc;

a motor for rotating the optical disc; and a control circuit for receiving a signal from the optical head apparatus to control drive of the optical head apparatus and the motor based on the signal.

* * * * *